United States Patent
Chen et al.

(10) Patent No.: US 9,924,191 B2
(45) Date of Patent: Mar. 20, 2018

(54) FILTERS FOR ADVANCED RESIDUAL PREDICTION IN VIDEO CODING

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 14/750,869

(22) Filed: Jun. 25, 2015

(65) Prior Publication Data

US 2015/0382009 A1    Dec. 31, 2015

Related U.S. Application Data

(60) Provisional application No. 62/017,754, filed on Jun. 26, 2014, provisional application No. 62/021,063, filed on Jul. 4, 2014.

(51) Int. Cl.
*H04N 7/12*      (2006.01)
*H04N 19/513*   (2014.01)
(Continued)

(52) U.S. Cl.
CPC ......... *H04N 19/513* (2014.11); *H04N 19/176* (2014.11); *H04N 19/523* (2014.11);
(Continued)

(58) Field of Classification Search
CPC .... H04N 19/82; H04N 19/523; H04N 19/176; H04N 19/597; H04N 19/573; H04N 19/80; H04N 19/513
(Continued)

(56) References Cited

U.S. PATENT DOCUMENTS

2007/0014348 A1*  1/2007  Bao ............... H04N 19/61
                                              375/240.1
2008/0130742 A1*  6/2008  Scheuermann .... H04N 21/2368
                                              375/240.02

(Continued)

FOREIGN PATENT DOCUMENTS

EP       1983759 A1 * 10/2008 ........... H04N 19/139
WO    2004004310 A1     1/2004

OTHER PUBLICATIONS

Bross, et al., "High Efficiency Video Coding (HEVC) text specification draft 9 (SoDIS)", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ), No. JCTVC-K1003, Oct. 21, 2012, 279 pp. [uploaded in parts].

(Continued)

*Primary Examiner* — Mohammed Rahaman
*Assistant Examiner* — Richard Carter
(74) *Attorney, Agent, or Firm* — Shumaker & Sieffert, P.A.

(57) ABSTRACT

A video coder is configured to apply a separable bilinear interpolation filter when determining reference blocks as part of advanced residual prediction. Particularly, the video coder may determine, based on a motion vector of a current block in a current picture of video data, a location of a first reference block in a first reference picture. The video coder may also determine a location of a second reference block in a second reference picture. The video coder may apply a separable bilinear interpolation filter to samples of the second reference picture to determine samples of the second reference block. The video coder may apply the separable bilinear interpolation filter to samples of a third reference picture to determine samples of a third reference block. Each respective sample of a predictive block may be equal to a (Continued)

respective sample of the first reference block plus a respective residual predictor sample.

14 Claims, 13 Drawing Sheets

(51) Int. Cl.
    H04N 19/176    (2014.01)
    H04N 19/573    (2014.01)
    H04N 19/80     (2014.01)
    H04N 19/597    (2014.01)
    H04N 19/82     (2014.01)
    H04N 19/523    (2014.01)

(52) U.S. Cl.
    CPC ......... *H04N 19/573* (2014.11); *H04N 19/597* (2014.11); *H04N 19/80* (2014.11); *H04N 19/82* (2014.11)

(58) Field of Classification Search
    USPC ............... 375/240.29, 240.1, 240.02, 240.16
    See application file for complete search history.

(56) References Cited

U.S. PATENT DOCUMENTS

| | | | |
|---|---|---|---|
| 2012/0134425 A1 | 5/2012 | Kossentini et al. | |
| 2015/0195506 A1* | 7/2015 | Lin ...................... | H04N 19/597 375/240.16 |

OTHER PUBLICATIONS

Tech, et al., "3D-HEVC Test Model 2," Joint Collaborative Team on 3D Video Coding Extension Development of ITU-T SG 16 WP 3 and ISO/IEC JTC 1/SC 29/WG 11, Oct. 13-19, 2012; Document: JCT3V-B1005_d0, 2nd Meeting: Shanghai, CN, 118 pp.
Third Written Opinion from International Application No. PCT/US2015/038070, dated Oct. 5, 2016, 10 pp.
Response to Third Written Opinion dated Oct. 5, 2016, from International Application No. PCT/US2015/038070, filed on Nov. 4, 2016, 36 pp.
International Preliminary Report on Patentability from International Application No. PCT/US2015/038070, dated Nov. 22, 2016, 13 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Ikai "CE4-related: ARP reference picture selection and its availability check", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-F0105, Oct. 18, 2013, XP030131520, 6 pp.
Tech, et al., "3D-HEVC Draft Text 4", JCT-3V Meeting; Mar. 29-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-H1001-v2, May 18, 2014, XP030132290, 102 pp.
Zhang, et al., "AHG4: Editorial improvement for ARP specification text in 3D-HEVC", JCT-3V Meeting; Jul. 3-9, 2014; Sapporo; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-I0129, Jun. 26, 2014, XP030132443, 6 pp.
Zhang, et al., "CE4: Advanced residual prediction for multiview coding", JCT-3V Meeting; Apr. 20-26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0177, XP030130841, Apr. 13, 2013, 9 pp.
Zhang, et al., "CE4: Further improvements on advanced residual prediction", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16 ), No. JCT3V-F0123, XP030131548, Oct. 18, 2013, 6 pp.
Zhang, et al., "CE5.h: Disparity vector generation results," JCT-Meeting; Jul. 16-20, 2012; (The Joint Collaborative Team on 3D Video Coding Extension Development of ISO/IEC JTC1/SC29/WG11 and ITU-T SG.16 ), No. JCT2-A0097, Jul. 10, 2012, 5 pp.
Sung, et al., "3D-CE5.h: Simplification of disparity vector derivation for HEVC-based 3D video coding," JCT-Meeting; Jul. 16-20, 2012; (The Joint Collaborative Team on 3D Video Coding Extension Development of ISO/IEC JTC1/SC29/WG11 and ITU-T SG.16 ), Jul. 14, 2012; No. JCT2-A0126, pp.
Liu, et al., "3D-CE2.h: Results of Illumination Compensation for Inter-View Prediction," JCT-Meeting; Oct. 13-19, 2012; (The Joint

(56) References Cited

OTHER PUBLICATIONS

Collaborative Team on 3D Video Coding Extension Development of ISO/IEC JTC1/SC29/WG11 and ITU-T SG.16 ), No. JCT3V-B0045, Oct. 11, 2012, 5 pp.

Liu, et al., "3D-CE2.h: Results of Illumination Compensation for Inter-View Prediction," JCT-Meeting; Oct. 13-19, 2012; (The Joint Collaborative Team on 3D Video Coding Extension Development of ISO/IEC JTC1/SC29/WG11 and ITU-T SG.16 ), No. JCT3V-B0045, Oct. 18, 2012; 12 pp.

Kang, et al., "3D-CE5.h related: Improvements for disparity vector derivation," JCT3V-Meeting; Oct. 13-19, 2012; (The Joint Collaborative Team on 3D Video Coding Extension Development of ISO/IEC JTC1/SC29/WG11 and ITU-T SG.16 ), No. JCT3V-B0047, Oct. 9, 2012; 4 pp.

Zhang, et al., "3D-CE5.h related: Advanced residual prediction for multiview coding," JCT3V-Meeting: Oct. 13-19, 2012; (The Joint Collaborative Team on 3D Video Coding Extension Development of ISO/IEC JTC1/SC29/WG11 and ITU-T SG.16 ), No. JCT3V-B0051, Oct. 7, 2012; 5 pp.

Zhang, et al., "Proposed text for JCT3V-00049 based on 3D-HEVC Test Model 2," JCT3V-Meeting; Jan. 17-23, 2013; (The Joint Collaborative Team on 3D Video Coding Extension Development of ISO/IEC JTC1/SC29/WG11 and ITU-T SG.16 ), No. JCT3V-00049_proposed text, Jan. 16, 2013; 6 pp.

Zhang, et al. "3D-CE4: Advanced residual prediction for multiview coding," JCT3V-Meeting; Jan. 17-23, 2013; (The Joint Collaborative Team on 3D Video Coding Extension Development of ISO/IEC JTC1/SC29/WG11 and ITU-T SG.16 ), No. JCT3V-00049, Jan. 10, 2013; 6 pp.

Ikai, "3D-CE5.h related: Removal of parsing dependency in illumination compensation," JCT3V-Meeting; Apr. 20-26, 2013; (The Joint Collaborative Team on 3D Video Coding Extension Development of ISO/IEC JTC1/SC29/WG11 and ITU-T SG.16 ), No. JCT3V-D0060; Apr. 12, 2013; 4 pp.

Ikai, "3D-CE5.h related: Removal of parsing dependency in illumination compensation," JCT3V-Meeting; Apr. 20-26, 2013; (The Joint Collaborative Team on 3D Video Coding Extension Development of ISO/IEC JTC1/SC29/WG11 and ITU-T SG.16 ), No. JCT3V-D0060_WD_text; 1 pp.

Zhang, et al., "CE4: Advanced residual prediction for multiview coding," JCT3V-Meeting; Apr. 20-26, 2013; (The Joint Collaborative Team on 3D Video Coding Extension Evelopment of ISO/IEC JTC1/SC29/WG11 and ITU-T SG.16 ), No. JCT3V-D0177_proposed_text_r1; Apr. 20, 2013; 6 pp.

Kang, et al., "CE2.h related: Cu-based Disparity Vector Derivation in 3D-HEVC," JCT3V-Meeting: Apr. 20-26, 2013; (The Joint Collaborative Team on 3D Video Coding Extension Development of ISO/IEC JTC1/SC29/WG11 and ITU-T SG.16 ), No. JCT3V-D0181, Apr. 13, 2013; 4 pp.

Kang, et al., "Proposed text for JCT3V-D0181 based on 3D-HEVC Test Model 3," JCT3V-Meeting; Apr. 20-26, 2013; (The Joint Collaborative Team on 3D Video Coding Extension Development of ISO/IEC JTC1/SC29/WG11 and ITU-T SG.16 ), No. JCT3V-D0181; Apr. 13, 2013; 8 pp.

Zhang, et al., "Proposed text for JCT3V-F0123 based on 3D-HEVC Draft Text 1," JCT3V-Meeting; Oct. 25-Nov. 1, 2013; (The Joint Collaborative Team on 3D Video Coding Extension Development of ISO/IEC JTC1/SC29/WG11 and ITU-T SG.16 ), No. JCT3V-F0123_proposed text, Oct. 25, 2013; 6 pp.

Tech, et al., "3D-HEVC Draft Text 2," JCT3V-Meeting; Oct. 25-Nov. 1, 2013; (The Joint Collaborative Team on 3D Video Coding Extension Development of ISO/IEC JTC1/SC29/WG11 and ITU-T SG.16 ), No. JCT3V-F1001_v4; Dec. 14, 2013; 94 pp.

Zhang, et al. "Test Model 6 of 3D-HEVC and MV-HEVC," JCT3V-Meeting; Oct. 25-Nov. 1, 2013; (The Joint Collaborative Team on 3D Video Coding Extension Development of ISO/IEC JTC1/SC29/WG11 and ITU-T SG.16 ), No. JCT3V-F1005; Dec. 16, 2013; 57 pp.

Wang; et al., "High Efficiency Video Coding (HEVC) Defect Report 3," JCT-VC Meeting: Jan. 9-17, 2014; (The Joint Collaborative Team on 3D Video Coding Extension Development of ISO/IEC JTC1/SC29/WG11 and ITU-T SG.16 ), No. JCTVC-P1003_v1 relative to L1003_v34; Feb. 8, 2014; 313 pp.

Wang; et al., "High Efficiency Video Coding (HEVC) Defect Report 3," JCT-VC Meeting: Jan. 9-17, 2014; (The Joint Collaborative Team on 3D Video Coding Extension Development of ISO/IEC JTC1/SC29/WG11 and ITU-T SG.16 ), No. JCTVC-P1003_v1 relative to O1003V2; Feb. 8, 2014; 313 pp.

International Search Report and Written Opinion from International Application No. PCT/US2015/038070, dated Aug. 31, 2015, 17 pp.

Response to Written Opinion dated Aug. 31, 2015, from International Application No. PCT/US2015/038070, filed on Apr. 22, 2016, 9 pp.

Second Written Opinion from International Application No. PCT/US2015/038070, dated Jun. 17, 2016, 9 pp.

ITU-T H.264, Series H: Audiovisual and Multimedia Systems, Infrastructure of audiovisual services—Coding of moving video, Advanced video coding for generic audiovisual services, The International Telecommunication Union. Mar. 2010, 669 pp. [uploaded in parts].

Zhang, et al., "CE4: Advanced residual prediction for multiview coding," JCT-VC Meeting: Apr. 20-26, 2013; (The Joint Collaborative Team on 3D Video Coding Extension Development of ISO/IEC JTC1/SC29/WG11 and ITU-T SG.16 ), Apr. 20, 2013; No. JCT3V-D0177_proposed_text, 5 pp.

Müller et al., "Common Test Conditions of 3DV Core Experiments," Jan. 11-17, 2014; ITU-T SG 16 WP 3 and ISO/IEC JTC 1/SC 29/WG 11, JCT3V-G1100, 7th Meeting: San José, US, Jan. 17, 2014, 7 pp.

* cited by examiner

|  | $ha_{0,-1}$ | $hb_{0,-1}$ | $hc_{0,-1}$ | $hd_{0,-1}$ | $he_{0,-1}$ | $hf_{0,-1}$ | $hg_{0,-1}$ | $hh_{0,-1}$ |  |
|---|---|---|---|---|---|---|---|---|---|
| $ah_{-1,0}$ | $B_{0,0}$ | $ab_{0,0}$ | $ac_{0,0}$ | $ad_{0,0}$ | $ae_{0,0}$ | $af_{0,0}$ | $ag_{0,0}$ | $ah_{0,0}$ | $B_{1,0}$ |
| $bh_{-1,0}$ | $ba_{0,0}$ | $bb_{0,0}$ | $bc_{0,0}$ | $bd_{0,0}$ | $be_{0,0}$ | $bf_{0,0}$ | $bg_{0,0}$ | $bh_{0,0}$ | $ba_{1,0}$ |
| $ch_{-1,0}$ | $ca_{0,0}$ | $cb_{0,0}$ | $cc_{0,0}$ | $cd_{0,0}$ | $ce_{0,0}$ | $cf_{0,0}$ | $cg_{0,0}$ | $ch_{0,0}$ | $ca_{1,0}$ |
| $dh_{-1,0}$ | $da_{0,0}$ | $db_{0,0}$ | $dc_{0,0}$ | $dd_{0,0}$ | $de_{0,0}$ | $df_{0,0}$ | $dg_{0,0}$ | $dh_{0,0}$ | $da_{1,0}$ |
| $eh_{-1,0}$ | $ea_{0,0}$ | $eb_{0,0}$ | $ec_{0,0}$ | $ed_{0,0}$ | $ee_{0,0}$ | $ef_{0,0}$ | $eg_{0,0}$ | $eh_{0,0}$ | $ea_{1,0}$ |
| $fh_{-1,0}$ | $fa_{0,0}$ | $fb_{0,0}$ | $fc_{0,0}$ | $fd_{0,0}$ | $fe_{0,0}$ | $ff_{0,0}$ | $fg_{0,0}$ | $fh_{0,0}$ | $fa_{1,0}$ |
| $gh_{-1,0}$ | $ga_{0,0}$ | $gb_{0,0}$ | $gc_{0,0}$ | $gd_{0,0}$ | $ge_{0,0}$ | $gf_{0,0}$ | $gg_{0,0}$ | $gh_{0,0}$ | $ga_{1,0}$ |
| $hh_{-1,0}$ | $ha_{0,0}$ | $hb_{0,0}$ | $hc_{0,0}$ | $hd_{0,0}$ | $he_{0,0}$ | $hf_{0,0}$ | $hg_{0,0}$ | $hh_{0,0}$ | $ha_{1,0}$ |
|  | $B_{0,1}$ | $ab_{0,1}$ | $ac_{0,1}$ | $ad_{0,1}$ | $ae_{0,1}$ | $af_{0,1}$ | $ag_{0,1}$ | $ah_{0,1}$ | $B_{1,1}$ |

FIG. 11

FILTERS FOR ADVANCED RESIDUAL PREDICTION IN VIDEO CODING

This application claims the benefit of U.S. Provisional Patent Application 62/017,754, filed Jun. 26, 2014, and U.S. Provisional Patent Application 62/021,063, filed Jul. 4, 2014, the entire content of each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC), standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure describes techniques of multi-view and 3-dimensional (3D) video coding based on advanced codecs, including the coding of two or more views with a 3D-HEVC codec. More specifically, this disclosure describes example techniques related to advanced residual prediction (ARP) in a non-base view.

In one example aspect, this disclosure describes a method of decoding video data, the method comprising: determining, based on a motion vector of a current block in a current picture of the video data, a location of a first reference block in a first reference picture; applying a separable bilinear interpolation filter to samples of the first reference picture to determine samples of the first reference block; determining a location of a second reference block in a second reference picture; applying the separable bilinear interpolation filter to samples of the second reference picture to determine samples of the second reference block; applying the separable bilinear interpolation filter to samples of a third reference picture to determine samples of a third reference block, wherein each of the first, second, and third reference pictures is a different picture; determining a predictive block, wherein each respective sample of the predictive block is equal to a respective sample of the first reference block plus a respective residual predictor sample, the respective residual predictor sample being equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block; obtaining, from a bitstream, data representing a residual block; and reconstructing, based at least in part on the residual block and the predictive block, a coding block of the current picture.

In another example aspect, this disclosure describes a method of encoding video data, the method comprising: determining, based on a motion vector of a current block in a current picture of the video data, a location of a first reference block in a first reference picture; applying a separable bilinear interpolation filter to samples of the first reference picture to determine samples of the first reference block; determining a location of a second reference block in a second reference picture; applying the separable bilinear interpolation filter to samples of the second reference picture to determine samples of the second reference block; applying the separable bilinear interpolation filter to samples of a third reference picture to determine samples of a third reference block, wherein each of the first, second, and third reference pictures is a different picture; determining a predictive block, wherein each respective sample of the predictive block is equal to a respective sample of the first reference block minus a respective residual predictor sample, the respective residual predictor sample is equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block; determining, based at least in part on the predictive block, a residual block; and including, in a bitstream, data representing the residual block.

In another example aspect, this disclosure describes a video coding device comprising: a memory configured to store video data; and one or more processors configured to: determine, based on a motion vector of a current block in a current picture of the video data, a location of a first reference block in a first reference picture; apply a separable bilinear interpolation filter to samples of the first reference picture to determine samples of the first reference block; determine a location of a second reference block in a second reference picture; apply the separable bilinear interpolation filter to samples of the second reference picture to determine samples of the second reference block; apply the separable bilinear interpolation filter to samples of a third reference picture to determine samples of a third reference block, wherein each of the first, second, and third reference pictures is a different picture; and determine a predictive block, wherein each respective sample of the predictive block is equal to a respective sample of the first reference block minus a respective residual predictor sample, the respective residual predictor sample is equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block.

In another example aspect, this disclosure describes a video coding device comprising: means for determining, based on a motion vector of a current block in a current picture of the video data, a location of a first reference block in a first reference picture; means for applying a separable bilinear interpolation filter to samples of the first reference picture to determine samples of the first reference block; determine a location of a second reference block in a second reference picture; means for applying the separable bilinear interpolation filter to samples of the second reference picture to determine samples of the second reference block; means for applying the separable bilinear interpolation filter to samples of a third reference picture to determine samples of a third reference block, wherein each of the first, second, and third reference pictures is a different picture; and means for determining a predictive block, wherein each respective sample of the predictive block is equal to a respective sample of the first reference block minus a respective residual predictor sample, the respective residual predictor sample is equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block.

In another example aspect, this disclosure describes a computer-readable storage medium having instructions stored thereon that, when executed, cause a device for coding video data to: determine, based on a motion vector of a current block in a current picture of the video data, a location of a first reference block in a first reference picture; applying a separable bilinear interpolation filter to samples of the first reference picture to determine samples of the first reference block; determine a location of a second reference block in a second reference picture; apply the separable bilinear interpolation filter to samples of the second reference picture to determine samples of the second reference block; apply the separable bilinear interpolation filter to samples of a third reference picture to determine samples of a third reference block, wherein each of the first, second, and third reference pictures is a different picture; and determine a predictive block, wherein each respective sample of the predictive block is equal to a respective sample of the first reference block plus a respective residual predictor sample, the respective residual predictor sample being equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 11 is a conceptual diagram illustrating example integer samples and fractional sample positions for eighth sample interpolation.

DETAILED DESCRIPTION

Figure 1:
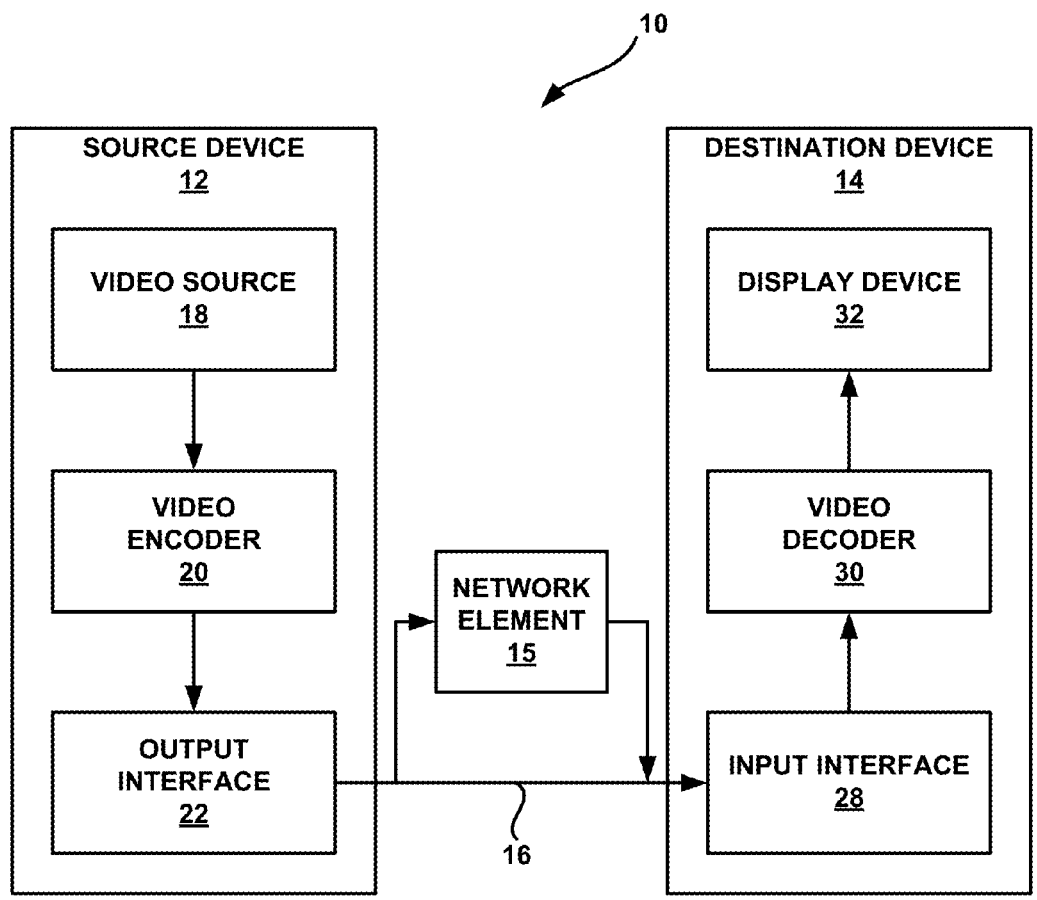
FIG. 1 is a block diagram illustrating an example video coding system that may utilize the techniques described in this disclosure.

Advanced residual prediction (ARP) is a video data compression technique used in multi-view/3D video coding. A video encoder using ARP generates a residual predictor for a current block. In some examples, the current block is a prediction block of a prediction unit (PU). Furthermore, in some examples, the video encoder applies a weighting factor to the residual predictor. In addition, the video encoder uses inter prediction to generate an initial predictive block for the current block. The video encoder may then generate a final predictive block (i.e., a final predictor) for the current block.

Conceptually, each respective sample in the final predictive block is equal to a sum of a respective corresponding sample in the residual predictor for the current block and a respective corresponding sample in the initial predictive block for the current block. Furthermore, the video encoder generates a residual block for the current block. Conceptually, each respective sample in the residual block for the current block indicates a difference between a respective corresponding sample in the final predictive block for the current block and a respective corresponding sample in the current block itself.

A sample is a value of a color component (e.g., luma, chroma, etc.) for a pixel. In this disclosure, a sample in a first block may be said to correspond to a sample in a second block if the two samples have the same locations within the first and second blocks, relative to top left samples of the first and second blocks. The video encoder includes, in a bitstream comprising encoded video data, data representing the residual block for the current block.

Similarly, when decoding the current block using ARP, a video decoder generates the residual predictor for the current block, reversing application of the weighting factor if needed. Additionally, the video decoder uses inter prediction to determine an initial predictive block for the current block. The video coder then determines a final predictive block (i.e., a final predictor) for the current block. Conceptually, each sample of the final predictive block is equal to a sum of a corresponding sample of the residual predictor and a corresponding sample of the initial predictive block.

The video decoder determines, based on data in the bitstream, the residual block for the current block. The video decoder reconstructs the current block based on the residual block for the current block and the final predictive block for the current block. Conceptually, each respective sample of the reconstructed current block is equal to a sum of a respective corresponding sample of the residual block for the current block and a respective corresponding sample of the final predictive block for the current block.

As indicated above, a video coder, i.e., a video encoder or a video decoder, generates a residual predictor for a current block of a current picture. To generate the residual predictor, the video coder determines, based on a motion vector of the current block, a location of a first reference block in a first reference picture. In some instances, the motion vector is a temporal motion vector. In other instances, the motion vector is a disparity motion vector.

A reference picture is a previously coded picture that is available to a video coder for use in coding a current picture. A reference block is a block of samples in a reference picture or interpolated from samples in a reference picture. In addition to determining the location of the first reference block, the video coder determines a location of a second reference block in a second reference picture and a location of a third reference block in a third reference picture.

In some examples, the first reference block, the second reference block, and the third reference block have the same size as the current block. Furthermore, in some examples, the residual predictor may be a block having the same size as the current block. The video coder may generate the residual predictor based on the second and third reference blocks. For instance, each respective residual sample of the residual predictor may be equal to a weighting factor multiplied by a difference between a respective corresponding sample in the second reference block and a respective corresponding sample in the third reference block.

In some examples, the current block is bi-directionally inter predicted. Hence, in such examples, the current block has two distinct motion vectors: a motion vector indicating a reference picture in a first reference picture list (L0) and a motion vector indicating a reference picture in a second reference picture list (L1). When a video coder codes a bi-directionally inter predicted current block using ARP, the video coder uses the L0 motion vector of the current block to determine, based on samples of a temporal reference picture in L0 (i.e., the L0 reference picture), a first L0 reference block. Additionally, the video coder may determine an L0 residual predictor.

The video coder may use the L0 motion vector of the current block determine the L0 residual predictor in the same way that the video coder would use a motion vector to determine a residual predictor in the uni-directional case. The video coder may then determine an initial L0 predictive block. Each respective sample in the initial L0 predictive block may indicate a sum of a respective sample of the first L0 reference block and a weighting factor multiplied by a corresponding sample in the L0 residual predictor. The video coder may repeat this process with the L1 motion vector to determine an initial L1 predictive block.

Next, the video coder may determine a final predictive block for the current block. Conceptually, each respective sample of the final predictive block is a weighted average of respective corresponding samples in the initial L0 and L1 predictive blocks. In the weighted average, the weights assigned to samples of the initial L0 and L1 predictive blocks may be based on the POC values of the L0 reference picture, the L1 reference picture, and the current picture. Hence, regardless of whether the current block is uni-directionally or bi-directionally inter predicted (i.e., uni-predicted or bi-predicted), the video coder may generate a final predictive block for the current block. This disclosure may simply refer to the final predictive block as the predictive block and the residual predictor.

In some instances, the motion vector of the current block has sub-integer precision. In other words, the motion vector may indicate a location between two actual samples of the reference picture, i.e., samples at integer positions. Samples at integer positions of a reference picture may be referred to herein as "integer samples." When a motion vector indicates a location between two actual samples of the reference picture, a video encoder interpolates the samples of a reference block based on integer samples of the reference picture. Accordingly, the video coder may interpolate the samples in reference blocks as part of generating a residual predictor in ARP.

In the description above, the samples of various blocks are described as "conceptually" having values equal to the sum or difference of corresponding samples in other blocks. In practice, a video coder may clip samples to ensure that samples remain in an applicable range. For example, the video coder may support samples having bit depths of 8 bits. Thus, in this example, a sample may have a range from −128 to 127. Additionally, in this example, the addition of two samples may result in a value greater than 127 and a subtraction of one sample from another sample may result in a values less than a minimum value, e.g., −128. Accordingly, the video coder may clip values greater than 127 to 127 and may clip values less than −128 to 128. Furthermore, the interpolation process may result in samples being outside the applicable range. Hence, in some circumstances, a video coder may clip interpolated samples.

3D-HEVC is an emerging standard for encoding multi-view/three-dimensional (3D) video data. Some video coder implementations of 3D-HEVC clip all intermediate data at least for the uni-directional prediction case, because the video coder implementations reuse the HEVC interpolation function. Such intermediate data may include samples of a predictive block for a current block and reference blocks for the current block. Because the video coders clip the intermediate data, the video coders perform three clipping operations per sample for uni-predicted ARP because the video coders generate three prediction blocks (i.e., the predictive block for the current block and the reference blocks) with the interpolation process.

Furthermore, some video coder implementations of 3D-HEVC use a non-separable filter when determining samples of the first reference block and the second reference block when using ARP. When the video coder applies the non-separable filter to determine a value of a sample at a sub-integer positions, the video coder uses clipping operations to determine x and y coordinates of the surrounding samples at full-integer positions.

Each clipping operation may involve two comparison operations: one for comparing a value to an upper bound and another for comparing the value to a lower bound. Hence, performing clipping operations adds computational complexity, which may slow coding processes and may result in greater power consumption.

Particular techniques of this disclosure may reduce the number of clipping operations involved in ARP. For instance, in accordance with a technique of this disclosure, when determining the first reference block, a video coder may apply a separable bilinear interpolation filter to samples of the first reference picture to determine samples of the first reference block. Similarly, when determining the second reference block, the video coder may apply the separable bilinear interpolation filter to samples of a second reference picture to determine samples of the second reference block. Similarly, when determining the third reference block, the video coder may apply the separable bilinear interpolation filter to samples of a third reference picture to determine samples of the third reference block. As a result of applying such a separable bilinear interpolation filter, the clipping operations involved with the non-separable filter may be avoided, which may reduce complexity. In addition, the weighted prediction process in HEVC design could be reused.

In some examples, the sum of coefficients used in the separable bilinear interpolation filter for each phase (e.g., sub-integer location) may sum to 64, which is the same as other bilinear interpolation filters used in Bross et al., "High Efficiency Video Coding (HEVC) Defect Report 3," Joint Collaborative Team on Video Coding (JCT-VC) of ITU-T SG16 WP3 and ISO/IEC JTC1/SC29/WG11, 16$^{th}$ Meeting, San Jose, US, January 2014, document no. JCTVC-P1003_v1 (hereinafter, "HEVC version 1" or the "HEVC draft specification"). In other words, for each respective phase of a plurality of phases, a sum of coefficients of the separable bilinear interpolation filter for the respective phase is equal to 64, the plurality of phases corresponding to sub-integer locations allowed by a video coding standard to which the bitstream conforms (e.g., 3D-HEVC). In some examples, for each respective phase of the plurality of phases, the sum of the respective coefficients of the separable bilinear interpolation filter for the respective phase is equal to (x*8, (8−x)*8), with x being equal to a value in a range of 0 through 8. The coefficients summing to 64 may have an added benefit of reducing complexity by harmonizing the interpolation filter used in ARP with a bilinear interpolation filter used elsewhere in HEVC version 1.

Accordingly, a video coder may determine, based on a motion vector of a current block in a current picture of the video data, a location of a first reference block in a first reference picture. The video coder may apply a separable bilinear interpolation filter to samples of the first reference picture to determine samples of the first reference block. Additionally, the video coder may determine a location of a second reference block in a second reference picture. Furthermore, the video coder may apply the separable bilinear interpolation filter to samples of the second reference picture to determine samples of the second reference block. The video coder may apply the separable bilinear interpolation filter to samples of a third reference picture to determine samples of a third reference block. Each of the first, second, and third reference pictures is a different picture. The video coder may determine a predictive block. Each respective sample of the predictive block is equal to a respective sample of the first reference block plus a respective residual predictor sample. The respective residual predictor sample is equal to a non-zero weighting factor multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12, a destination device 14, and a network element 15. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones (i.e., smartphones, cell phones, cellular telephones), televisions, cameras, display devices, digital media players, video gaming consoles, in-car computers, or the like.

Network element 15 may receive encoded video data and may output processed encoded video data. Network element 15 may be a media aware network element (MANE), content delivery network (CDN) device, or another type of device (e.g., computing device). Network element 15, source device 12, destination device 14, and other types of device that process video data may be considered video processing devices.

Destination device 14 may receive encoded video data from source device 12 via a channel 16. Channel 16 may comprise one or more media or devices capable of moving the encoded video data from source device 12 to destination device 14. In one example, channel 16 comprises one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data (e.g., video data) is retrieved from a local memory, streamed over a network, or the like. A video encoding device may encode and store data (e.g., video data) to memory, and/or a video decoding device may retrieve and decode data (e.g., video data) from memory. In many examples, the encoding and decoding is performed by devices that do not communicate with one another, but simply encode data to memory and/or retrieve and decode data (e.g., video data) from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data. Thus, in some examples, source device 12 comprises a camera configured to capture video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 is configured to display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. The latest joint draft of MVC is described in "Advanced video coding for generic audiovisual services," ITU-T Recommendation H.264, March 2010. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, and ISO/IEC MPEG-4 Visual.

In other examples, video encoder 20 and video decoder 30 operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). The HEVC draft specification is available from http://phenix.it-sudparis.eu/jct/doc_end_user/documents/16_San%20Jose/wg11/JCTVC-P1003-v1.zip.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples. In other examples, a picture may comprise sample arrays for different types of color components, such as RGB, YCgCo, and so on.

To generate an encoded representation of a picture, video encoder 20 generates a set of coding tree units (CTUs). Each of the CTUs may comprise a coding tree block (CTB) of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more sample blocks. Example types of video units may include CTUs, CUs, PUs, transform units (TUs), macroblocks, macroblock partitions, and so on. In some contexts, discussion of PUs may be interchanged with discussion of macroblocks or macroblock partitions.

To generate an encoded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU. If video encoder 20 uses inter prediction to generate the predictive blocks of a PU, video encoder 20 may generate the predictive blocks of the PU based on decoded samples of one or more pictures other than the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units encapsulating RBSPs for video coding data (as opposed to RBSPs for parameter sets and SEI messages) may be referred to as video coding layer (VCL) NAL units. In HEVC (i.e., non-multi-layer HEVC), an access unit may be a set of NAL units that are consecutive in decoding order and contain exactly one coded picture. In addition to the coded slice NAL units of the coded picture, the access unit may also contain other NAL units not containing slices of the coded picture. In some examples, the decoding of an access unit always results in a decoded picture. Supplemental Enhancement Information (SEI) contains information that is not necessary to decode the samples of coded pictures from VCL NAL units. An SEI RBSP contains one or more SEI messages.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D Video coding based on HEVC (3D-HEVC). For 3D-HEVC, new coding tools, including those at the CU/PU level, for both texture and depth views may be included and supported. A reference software description is available as follows: Zhang et al, "Test Model 6 of 3D-HEVC and MV-HEVC," JCT3V-F1005, Joint Collaborative Team on 3D Video Coding Extension Development of ITU-T SG 16 WP 3 and ISO/IEC JTC 1/SC 29/WG 11, 6th Meeting: Geneva, CH, November 2013, hereinafter "JCT3V-F1005." JCT3V-F1005 can be downloaded from the following link: http://phenix.it-sudparis.eu/jct2/doc_end_user/current_document.php?id=1636. Tech et al., "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, CH, November 2013, document JCT3V-F1001 (hereinafter, "3D-HEVC Draft Text 2") is a working draft of 3D-HEVC. 3D-HEVC Draft Text 2 can be downloaded from the following link: http://phenix.it-sudparis.eu/jct2/doc_end_user/documents/6_Geneva/wg11/JCT3V-F1001-v4.zip.

Tech et al., "3D-HEVC Draft Text 4," Joint Collaborative Team on 3D Video Coding Extension Development of ITU-T SG 16 WP 3 and ISO/IEC JTC 1/SC 29/WG 11, 8th Meeting: Valencia, ES, 29 March-4 Apr. 2014, document JCT3V-H1001_v2 (hereinafter, "3D-HEVC Draft Text 4" or "current 3D-HEVC") is another working draft of 3D-HEVC.

The techniques of this disclosure are potentially applicable to multi-view coding and/or 3DV standards and specifications, including MV-HEVC and 3D-HEVC. In multi-view coding, such as that defined in MV-HEVC, 3D-HEVC Draft Text 2, and 3D-HEVC Draft Text 4, there may be multiple views of the same scene from different viewpoints. In the context of multi-view coding and scalable video coding, the term "access unit" may be used to refer to the set of pictures that correspond to the same time instance. In some instances, in the context of multi-view coding and scalable video coding, an access unit may be a set of NAL units that are associated with each other according to a specified classification rule, are consecutive in decoding order, and contain the VCL NAL units of all coded pictures associated with the same output time and their associated non-VCL NAL units. Thus, video data may be conceptualized as a series of access units occurring over time.

In 3DV coding, such as that defined in 3D-HEVC Draft Text 4, a "view component" may be a coded representation of a view in a single access unit. A view component may contain a depth view component and a texture view component. A depth view component may be a coded representation of the depth of a view in a single access unit. A texture view component may be a coded representation of the texture of a view in a single access unit. In this disclosure, a "view" may refer to a sequence of view components associated with the same view identifier.

The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

In multi-view coding and SVC coding, a bitstream may have a plurality of layers. In multi-view coding, each of the layers may correspond to a different view. A layer may be referred to as a "base layer" if a video decoder, e.g., video decoder 30, can decode pictures in the layer without reference to pictures in any other layer. A layer may be referred to as a "non-base layer" or a "dependent layer" if decoding of the layer is dependent on decoding of pictures in one or more other layers. When coding a picture in one of the non-base layers, a video coder, such as video encoder 20 or video decoder 30, may add a picture into a reference picture list if the picture is in a different view but within a same time instance, i.e., access unit, as the picture that the video coder is currently coding. Like other inter prediction reference pictures, the video coder may insert an inter-view prediction reference picture at any position of a reference picture list.

In SVC, layers other than the base layer may be referred to as "enhancement layers" and may provide information that enhances the visual quality of video data decoded from the bitstream. SVC can enhance spatial resolution, signal-to-noise ratio, i.e., quality, or temporal rate. In scalable video coding, e.g., SHVC, a "layer representation" may be a coded representation of a spatial layer in a single access unit. For ease of explanation, this disclosure may refer to view components and/or layer representations as "view components/layer representations" or simply "pictures."

To implement the layers, headers of NAL units may include nuh_reserved_zero_6bits syntax elements, which may also be referred to as "nuh_layer_id" syntax elements. NAL units that have nuh_reserved_zero_6 bit syntax elements that specify different values belong to different layers of a bitstream. Thus, in multi-view coding (e.g. MV-HEVC), 3DV (e.g. 3D-HEVC), or SVC (e.g., SHVC), the nuh_reserved_zero_6bits syntax element of a NAL unit specifies a layer identifier (i.e., a layer ID) of the NAL unit. In some examples, the nuh_reserved_zero_6bits syntax element of a NAL unit is equal to 0 if the NAL unit relates to a base layer in multi-view coding (e.g., MV-HEVC), 3DV coding (e.g. 3D-HEVC), or SVC (e.g., SHVC). Data in a base layer of a bitstream may be decoded without reference to data in any other layer of the bitstream. If the NAL unit does not relate to a base layer in multi-view coding, 3DV, or SVC, the nuh_reserved_zero 6bits syntax element of the syntax element may have a non-zero value. As indicated above, in multi-view coding and 3DV coding, different layers of a bitstream may correspond to different views.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit is less than the temporal identifier of a second NAL unit, the data encapsulated by the first NAL unit may be decoded without reference to the data encapsulated by the second NAL unit.

Figure 2:
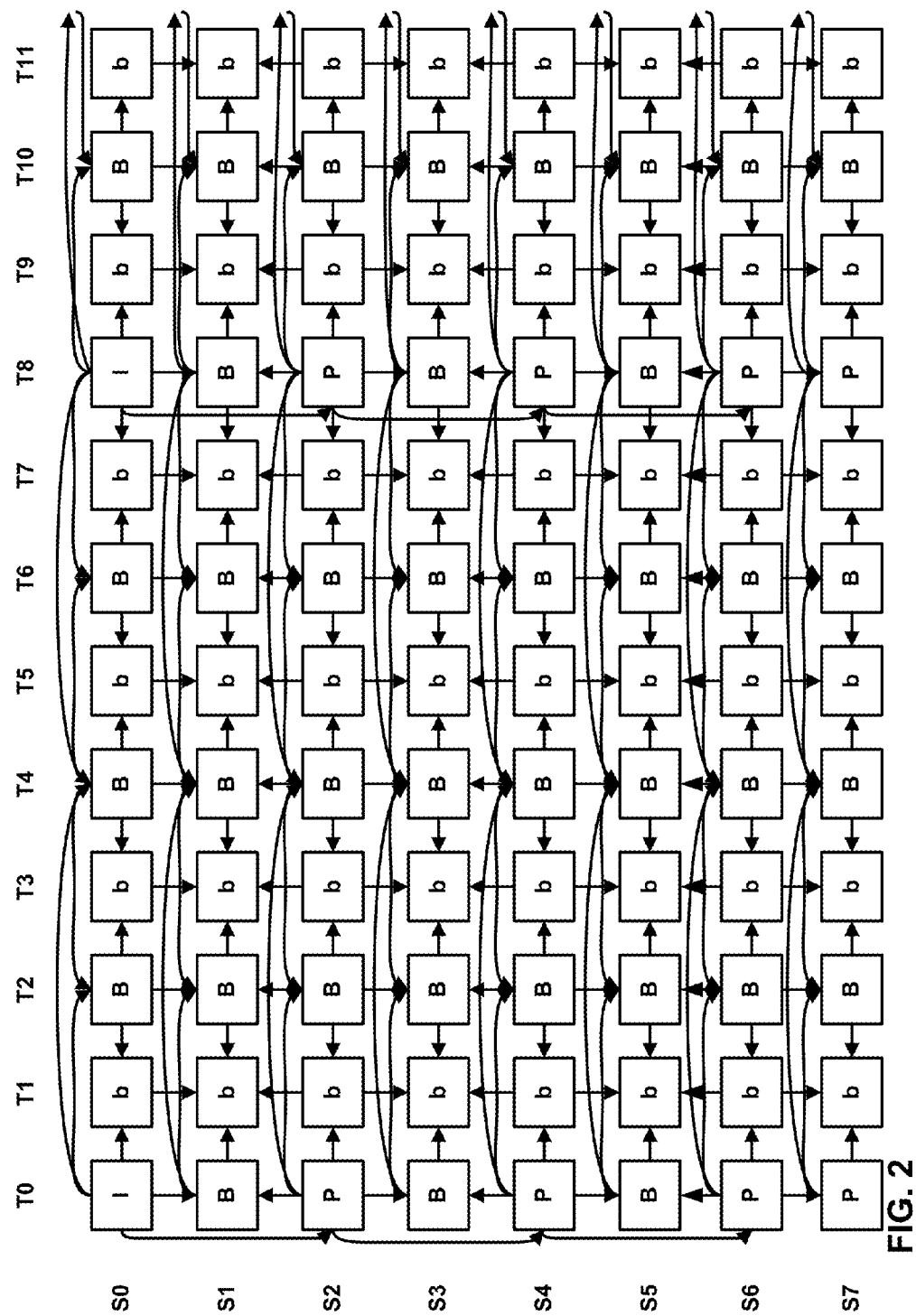
FIG. 2 is a conceptual diagram illustrating an example prediction structure for multi-view coding.

FIG. 2 is a conceptual diagram illustrating an example prediction structure for multi-view coding. The multi-view prediction structure of FIG. 2 includes temporal and inter-view prediction. In the example of FIG. 2, each square corresponds to a view component. In the example of FIG. 2, the access units are labeled T0 . . . T11 and the views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 2, view components in different views of the same access unit may be available as reference pictures. Thus, FIG. 2 shows a typical multi-view coding prediction (including both inter-picture prediction within each view and inter-view prediction) structure for multi-view video coding, where predictions are indicated by arrows, the pointed-to object using the pointedfrom object for prediction reference. The use of one view component of an access unit as a reference picture for another view component of the same access unit may be referred to as inter-view prediction.

In multi-view coding, inter-view prediction is performed among pictures captured in the different views of the same access unit (i.e., with the same time instance) to remove correlation between views. A picture coded with inter-view prediction may be added into a reference picture list for the inter-view prediction of the other non-base views. An inter-view prediction reference picture can be put in any position of a reference picture list in the same way with an inter prediction reference picture.

In the context of multi-view video coding, there are two types of motion vectors. One type is normal motion vectors (i.e., temporal motion vectors) pointing to temporal reference pictures and the corresponding temporal inter prediction is motion-compensated prediction (MCP). The other type is disparity motion vectors (DMVs) pointing to pictures in a different view (i.e., inter-view reference pictures) and the corresponding inter prediction is disparity-compensated prediction (DCP). Video coders may use both temporal motion vectors and disparity motion vectors for inter prediction. In general, a disparity vector is not a disparity motion vector unless used for inter prediction.

In HEVC version 1, there are two inter prediction modes, named merge (skip is considered as a special case of merge) and advanced motion vector prediction (AMVP) modes respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index is explicitly signaled, together with an MVP index to the MV candidate list since the AMVP candidate contains only a motion vector. In AMVP mode, motion vector difference between a selected motion vector and a motion vector predictor corresponding to the MVP index is further signaled. As can be seen above, a merge candidate corresponds to a full set of motion information while an AMVP candidate contains just one motion vector for a specific prediction direction and reference index.

In 3D-HEVC Draft Text 4, a final merge candidate list includes entries from an HEVC base merge list (i.e., the merge list as generated according to HEVC Version 1) and the additional candidates derived through so-called inter-view prediction. More specifically, the major processes are described as follows.

First, spatial and temporal merge candidates are inserted into the base merge candidate list, similar as in HEVC version 1. Second, virtual candidates, which are also known as combined bi-predictive merging candidates, and zero candidates are inserted into the base merge candidate list when necessary, so that the total number of candidates is equal to MaxNumMergeCand, which is equal to the number of single-view HEVC candidates as signaled in the slice header plus one, e.g., if inter-view prediction or motion parameter inheritance (MPI) is enabled. After this, the HEVC base candidate list is formed. Third, the 3D-HEVC merge list is generated by inserting the additional 3D-HEVC candidates as well as candidates in the HEVC base candidate list into one list. Fourth, the additional 3D-HEVC candidates list include: Inter-view predicted motion candidate, denoted as IvMC; Inter-view disparity vector candidate, denoted as IvDC; View synthesis prediction candidate, denoted as VSP; Shifting candidate, denoted as IvShift, being equal to either a shifted inter-view predicted motion candidate, denoted as IvMC Shift, or a shifted disparity merging candidate, denoted by IvDC Shift.

A video coder may use a disparity vector (DV) as an estimator of the disparity between two views. A video coder may use a neighboring block based disparity vector (NBDV) process to derive a disparity vector. The NBDV process is used for a disparity vector derivation method in 3D-HEVC Draft Text 4, which uses the texture-first coding order for all the views. In 3D-HEVC Draft Text 4, the disparity vector derived from NBDV could be further refined by retrieving the depth data from reference view's depth map.

When a video coder performs the NBDV process to derive a disparity vector, the video coder uses a disparity vector (DV) as an estimator of the displacement between two views. Because neighboring blocks share almost the same motion/disparity information in video coding, the current block can use the motion vector information in neighboring blocks as a good predictor. Following this idea, the NBDV process uses the neighboring disparity information for estimating the disparity vector in different views.

Several spatial and temporal neighboring blocks are firstly defined. These neighboring blocks may be referred to as "disparity motion vector candidates." The video coder then checks each of the spatial and temporal neighboring blocks in a pre-defined order determined by the priority of the correlation between the current block and the candidate block. Once the video coder finds a disparity motion vector (i.e., the motion vector points to an inter-view reference picture) in the disparity motion vector candidates, the video coder converts the disparity motion vector to a disparity vector. The video coder returns the disparity vector and the associated view order index as outputs of the NBDV process. A view order index of a view may indicate a camera position of the view relative to other views. As alluded to above, the video coder may use two sets of neighboring blocks in the NBDV process. One set of neighboring blocks is spatial neighboring blocks and the other set of neighboring blocks is temporal neighboring blocks.

The NBDV process proposed in L. Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, $1^{st}$ Meeting: Stockholm, SE, 16-20 Jul. 2012, document JCT3V-A0097 (hereinafter, "JCT3V-A0097") was adopted into 3D-HEVC first. The NBDV derivation process has since been further adapted. For instance, implicit disparity vectors (IDVs) were included with a simplified NBDV in Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document JCT3V-A0126 (hereinafter, "JCT3V-A0126"). Furthermore, in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0047 (hereinafter, "JCT3V-B0047"), the NBDV derivation process is further simplified by removing the IDVs stored in the decoded picture buffer, while providing an improved coding gain with the RAP picture selection. Kang et al., "CE2: CU-based Disparity Vector Derivation in 3D-HEVC," Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013, document JCT3V-D0181, proposed a CU-based NBDV where a DV is derived for a CU, and applied for all the PUs therein.

Figure 3:
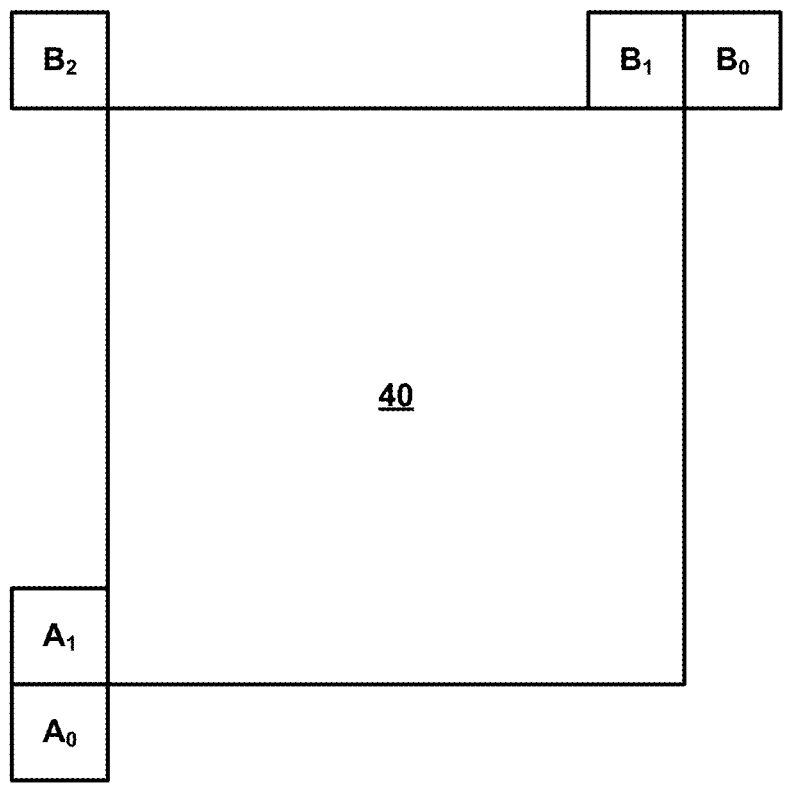
FIG. 3 is a conceptual diagram illustrating example spatial motion vector neighbors relative to one coding unit (CU).

In some NBDV processes, the video coder uses five spatial neighboring blocks for the disparity vector derivation. The five spatial neighboring blocks are the below-left, left, above-right, above and above-left blocks of the CU covering the current PU, as denoted by $A_0$, $A_1$, $B_0$, $B_1$ or $B_2$, as shown in FIG. 3. FIG. 3 is a conceptual diagram illustrating example spatial motion vector neighbors relative to one CU 40. The spatial neighbors shown in FIG. 3 are the same as those used in the merge and AMVP modes in HEVC version 1. Therefore, in some examples, no additional memory access is required to retrieve motion information of the spatial neighboring when performing the NBDV process.

For checking temporal neighboring blocks in the NBDV process, a video coder first performs a construction process of a candidate picture list. The video coder may treat up to two reference pictures from a current view as candidate pictures. A co-located reference picture is first inserted to the candidate picture list, followed by additional candidate pictures in the ascending order of reference index. One or more syntax elements in a slice header of a slice containing the current block may indicate the co-located reference picture. When the reference pictures with the same reference index in both reference picture lists are available, the one in the same reference picture list of the co-located picture precedes the other one. For each candidate picture in the candidate picture list, three candidate regions are determined for deriving the temporal neighboring blocks.

When a block is coded with inter-view motion prediction, a disparity vector needs to be derived for selecting a corresponding block in a different view. Implicit disparity vector (IDV) is referred as to the disparity vector derived in the inter-view motion prediction. An IDV may also be referred to as a "derived disparity vector." Even though the block is coded with motion prediction, the derived disparity vector is not discarded for the purpose of coding a following block.

The term "3D-HTM" refers to a test model for 3D-HEVC. In the design of 3D-HTM 7.0 and later versions of 3D-HTM, a video coder performing the NBDV process checks disparity motion vectors in the temporal neighboring blocks, disparity motion vectors in the spatial neighboring blocks, and then the IDVs in order. Once the video coder finds the disparity motion vector or IDV, the video coder terminates the NBDV process. Furthermore, in the current design of 3D-HTM 7.0 and later versions of 3D-HTM, the number of spatial neighboring blocks checked in the NBDV process is further reduced to 2.

In some examples, when a video coder derives a disparity vector from the NBDV process, the video coder further refines the disparity vector by retrieving the depth data from a depth map of a reference view. In some such examples, the refinement process includes two steps:
1. Locate a corresponding depth block by the derived disparity vector in the previously coded reference depth view, such as the base view. The size of the corresponding depth block is the same as the size of a current PU.
2. Select one depth value from four corner pixels of the corresponding depth block and convert the selected depth value to a horizontal component of a refined disparity vector. The vertical component of the disparity vector is unchanged.

In some instances, the video coder uses the refined disparity vector for inter-view motion prediction while the video coder uses the unrefined disparity vector for inter-view residual prediction. In addition, the video coder stores the refined disparity vector as the motion vector of one PU if the refined disparity vector is coded with backward view synthesis prediction mode. In some designs, the video coder always accesses the depth view component of the base view regardless of the value of a view order index derived from the NBDV process.

Advanced residual prediction (ARP) is a coding tool for exploiting the residual correlation between views. In ARP, a video coder produces a residual predictor by aligning motion information at a current view for motion compensation in a reference view. In addition, weighting factors are introduced to compensate for quality differences between views. When ARP is enabled for one block, video encoder 20 signals the difference between a current residual and the residual predictor. In some implementations, ARP can only be applied to inter-coded CUs with partition mode equal to Part_2N×2N (i.e., each CU has only one PU). ARP may be applied for both the luma (Y) component and the chroma (Cb and Cr) components. In the following description, application of an operation (such as sum, subtraction) on one block (or pixel) means application of the operation on each component (Y, Cb and Cr) of each pixel in the block (or pixel). When there is a need to distinguish the process for luma and chroma components, the process for luma component is called luma ARP (sub-PU ARP) and the process for chroma components is called chroma ARP (sub-PU ARP).

The phrase "ARP for temporal residual" may be used to refer to the use of ARP when a current block has a temporal motion vector (i.e., a motion vector indicating a location in a reference picture having a different Picture Order Count (POC) value from the POC value of the current picture). A POC value is a variable that is associated with each picture such that when the associated picture is to be output from a decoded picture buffer, the POC value indicates the position of the associated picture in output order relative to output order positions of other pictures in a same CVS that are to be output from the decoded picture buffer. ARP for temporal residual was adopted in the 3D-HEVC standard in the $4^{th}$ JCT3V meeting, as proposed in Zhang et al., "CE4: Advanced residual prediction for multiview coding," Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, document JCT3V-D0177 (hereinafter, "JCT3V-D0177").

Figure 4:
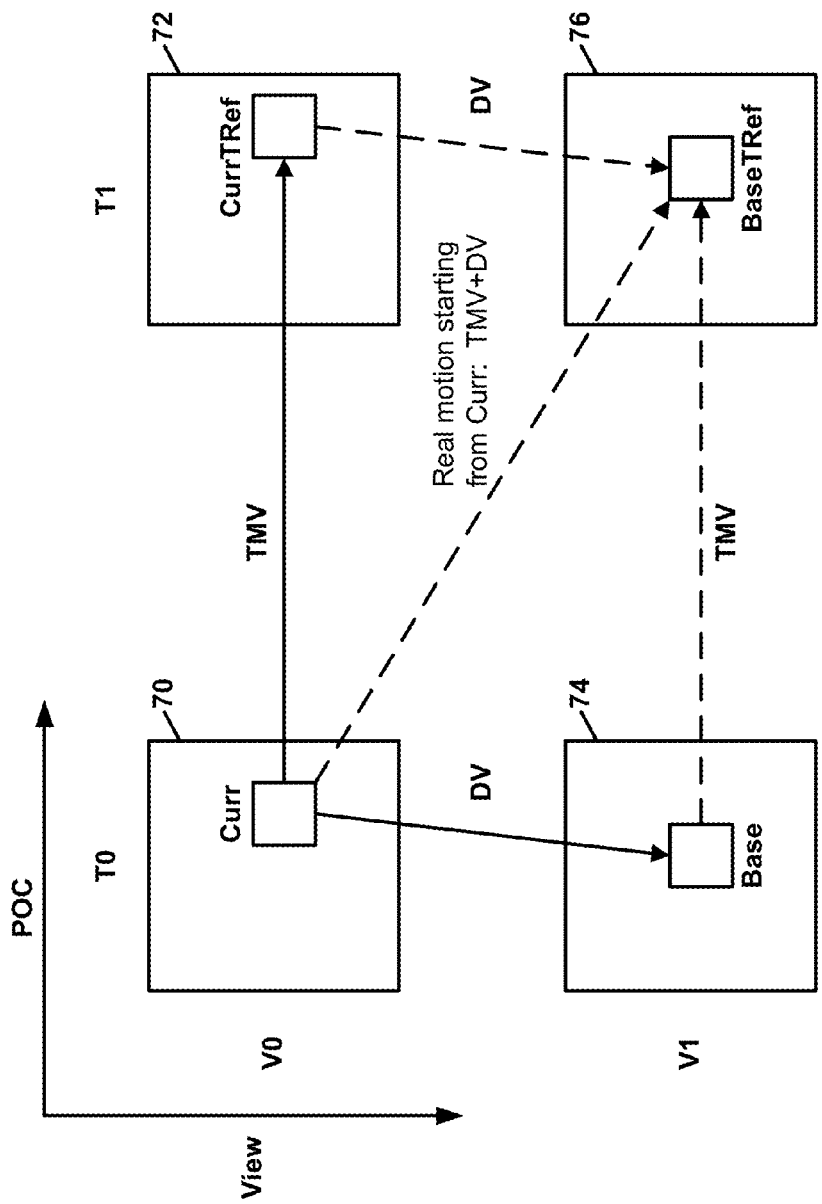
FIG. 4 illustrates an example prediction structure of advanced residual prediction (ARP) for temporal residual in multi-view video coding.

FIG. 4 illustrates an example prediction structure of ARP for temporal residual (i.e., current reference picture in one reference picture list is a temporal reference picture) in multi-view video coding. As shown in FIG. 4, the following blocks are invoked in the prediction of the current block.
1. Current block: Curr
2. Reference block in reference/base view derived by the disparity vector (DV): Base.
3. A block in the same view as block Curr derived by the (temporal) motion vector (denoted as TMV) of the current block: CurrTRef.

4. A block in the same view as block Base derived by the temporal motion vector of the current block (TMV): BaseTRef. This block is identified with a vector of TMV+DV compared with the current block Curr.

In the example of FIG. 4, Curr is in a current picture 70, CurrTRef is in a reference picture 72, Base is in a reference picture 74, and BaseTRef is in a reference picture 76.

The residual predictor is denoted as: BaseTRef-Base, wherein the subtraction operation applies to each pixel of the denoted pixel arrays. In other words, each respective sample of the residual predictor may be equal to a respective corresponding sample of BaseTRef minus a respective corresponding sample of Base. A weighting factor w is further multiplied to the residual predictor. Therefore, the final predictor of the current block is denoted as: CurrTRef+w* (BaseTRef-Base). In other words, each respective sample of the final predictor (i.e., final predictive block) for the current block (Curr) is based on a sum of a corresponding respective sample of CurrTRef and a respective corresponding sample of the weighted residual predictor, i.e., w*(BaseTRef-Base). The description below and FIG. 4 are both based on the assumption that uni-directional prediction is applied. When extending to the case of bi-directional prediction, the above steps are applied for each reference picture list.

In some examples, three weighting factors are used in ARP, i.e., 0, 0.5 and 1. The weighting factor leading to minimal rate-distortion cost for the current CU may be selected as the final weighting factor and the corresponding weighting factor index (0, 1 and 2 which correspond to weighting factor 0, 1, and 0.5, respectively) is transmitted in the bitstream at the CU level. In some examples, all PU predictions in one CU share the same weighting factor. When the weighting factor is equal to 0, ARP is not used for the current CU.

Main procedures of the proposed ARP at the decoder side can be described as follows. First, video decoder 30 obtains a disparity vector as specified in 3D-HEVC Draft Text 4, pointing to a target reference view. Then, in the picture of the reference view within the same access unit, the corresponding block is located by the disparity vector. Second, the motion information of the current block is re-used to derive the motion information for the reference block. Video decoder 30 applies motion compensation for the corresponding block based the same motion vector of the current block and derived reference picture in the reference view for the reference block, to derive a residue block.

Figure 5:
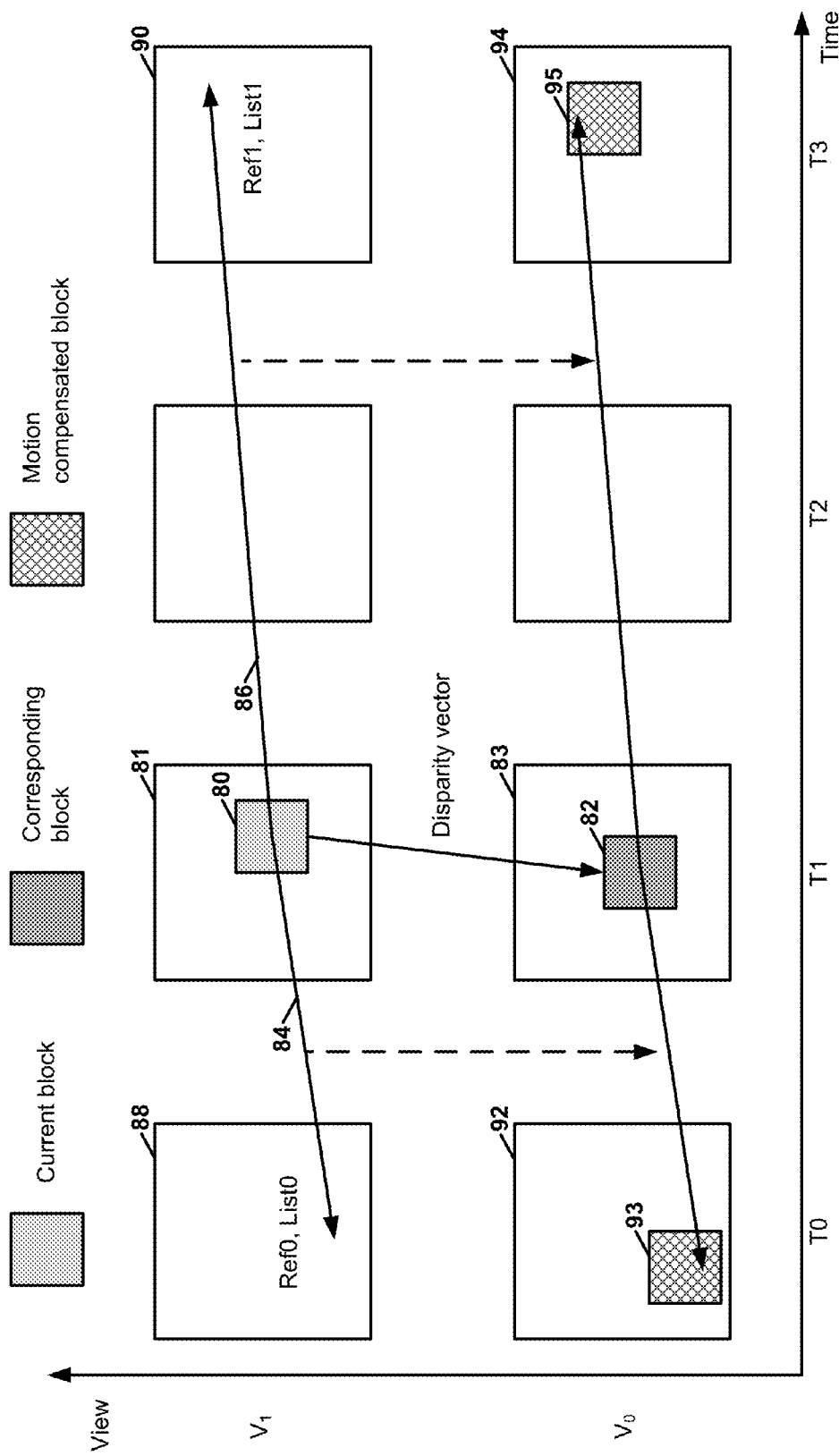
FIG. 5 is a conceptual diagram illustrating an example relationship among a current block and reference blocks.

FIG. 5 is a conceptual diagram illustrating an example relationship among a current block and reference blocks. Particularly, FIG. 5 shows an example relationship among the current block, the corresponding block, and the motion compensated block. The reference picture in the reference view ($V_0$) which has the same POC value as the reference picture of current view ($V_m$) is selected by video decoder 30 as the reference picture of the corresponding block. Third, decoder 30 applies the weighting factor to the residue block to get a weighted residue block and add the values of the weighted residue block to the predicted samples.

In the example of FIG. 5, a current block 80 occurs in view $V_1$ at a time instance T1. A corresponding block 82 is in a different view than current block 80 (i.e., view $V_0$) and in the same time instance as current block 80 (i.e., time instance T1). A video coder may use a disparity vector of current block 80 to identify corresponding block 82. In the example of FIG. 5, current block 80 is bi-predictive. Hence, current block 80 has a first motion vector 84 and a second motion vector 86. Motion vector 84 indicates a position in a reference picture 88. Reference picture 88 is in view $V_1$ and in time instance T0. Motion vector 86 indicates a position in reference picture 90. Reference picture 90 occurs in view $V_0$ and in time instance T3.

In ARP, the video coder may apply motion vector 84 and motion vector 86 to the location of corresponding block 82 to determine locations of reference blocks 93 and 95 (i.e., motion compensated blocks). Reference blocks 93 and 95 include samples of or are interpolated from samples of reference picture 92 and reference picture 94, respectively. Because current block 80 is bi-directionally inter predicted, the video coder may determine a blended reference block based on reference blocks 93 and 95. Each respective sample of the blended reference block is a weighted average of a respective corresponding sample of reference block 93 and a respective corresponding sample of reference block 95. The video coder may use the two motion vectors of current block 80 to determine a first residual predictor and a second residual predictor. Additionally, the video coder may determine a first initial predictive block and a second initial predictive block. The first initial predictive block may be a sum of reference block 93 and the first residual predictor. The second initial predictive block may be a sum of reference block 95 and the second residual predictor. Each sample of a final residual predictor for current block 80 may be a weighted average of corresponding samples of the first and second initial predictive blocks.

The phrase "ARP for inter-view residual" may be used to refer to the use of ARP when a current block has a disparity motion vector (i.e., a motion vector indicating a location in a reference picture belong to a view different from a view of the current picture). When ARP is applied for inter-view residual, a current PU is using inter-view ARP. When ARP is applied for temporal residual, the current PU is using temporal ARP. In the following description, if the corresponding reference for one reference picture list is a temporal reference picture and ARP is applied, it is denoted as temporal ARP. Otherwise, if the corresponding reference for one reference picture list is an inter-view reference picture and ARP is applied, it is denoted as inter-view ARP.

Similar to the ARP design for temporal residual, when a current PU uses an inter-view reference picture, prediction of the inter-view residual may be enabled. Firstly, a video coder calculates the inter-view residual within a different access unit, then the video coder uses the calculated residual information to predict the inter-view residual of the current block. This part was proposed in Zhang et al., "CE4: Further improvements on advanced residual prediction," Joint Collaborative Team on 3D Video Coding Extensions of ITU-T SG 16 WP 3 and ISO/IEC JTC 1/SC 29/WG 11, 6th Meeting: Geneva, CH, 25 Oct.-1 Nov. 2013, document JCT3V-F0123, (hereinafter, "JCT3V-F0123"), which has been adopted into 3D-HEVC.

Figure 6:
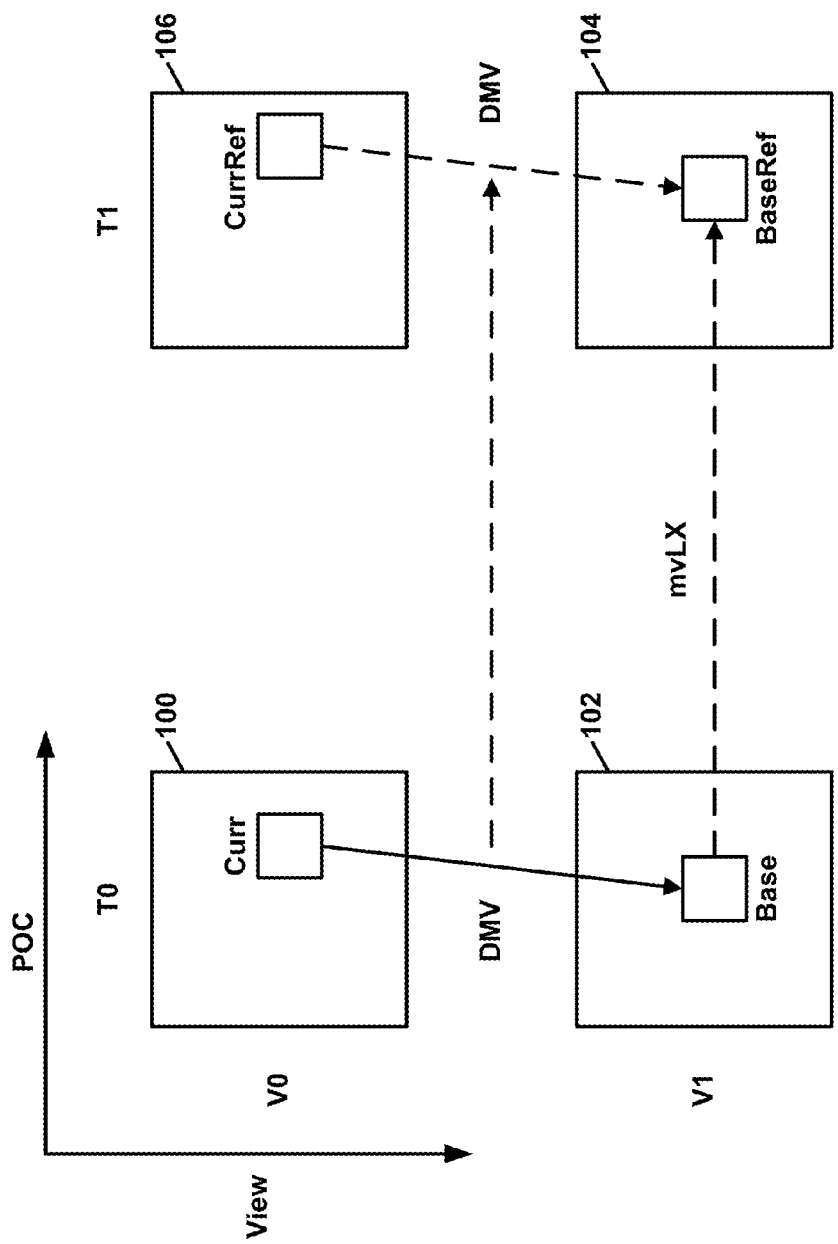
FIG. 6 is a conceptual diagram illustrating ARP for inter-view residual.

FIG. 6 is a conceptual diagram illustrating ARP for inter-view residual. In practice, three related blocks are identified: a reference block in the reference view located by a disparity motion vector of the current block (denoted by Base); a reference block of Base in the reference view (denoted by BaseRef) located by a temporal motion vector (mvLX) and reference index, if available, contained by Base; a reference block in the current view (denoted by CurrRef) generated by reusing the temporal motion information from Base, as shown in FIG. 6. In some implementations, the video decoder determines CurrRef as being at a location indicated by the location coordinates of BaseRef minus the disparity motion vector (DMV), which is equal to the location indicated by the location coordinates of Curr plus the temporal motion vector (mvLX). In the example of FIG. 6, Curr is in current picture 100, Base is based on samples in a reference picture 102, BaseRef is based on samples in a reference picture 104, and CurrRef is based on samples in a reference picture 106.

With the identified three blocks, the video coder can calculate the residual predictor of the residual signal of the current PU (i.e., Curr) as the difference between these two blocks in the different access unit: CurrRef–BaseRef. In other words, each respective sample of the residual predictor for Curr may be based on a respective corresponding sample of CurrRef minus a respective corresponding sample of BaseRef. Furthermore, video encoder 20 may multiply the inter-view predictor by a weighting factor as used in current ARP. Video decoder 30 may perform a shift operation to reverse the effect of the weighting factor. Video encoder 20 may generate a final predictive block for Curr such that each respective sample of the final predictive block is based on a respective corresponding sample of Base minus a respective corresponding sample of the potentially weighted residual predictor. For instance, each respective sample of the final residual block may be equal to a respective corresponding sample of Base minus a respective corresponding sample of the potentially weighted residual predictor. Each respective sample of the residual for Curr may be based on a respective corresponding sample of a prediction block of Curr minus a corresponding respective sample of the final predictive block for Curr.

Similar to ARP for temporal residual, a video coder may use a bi-linear filter to generate the three relative blocks. Furthermore, when the temporal motion vector contained by Base points to a reference picture that is in a different access unit of the first available temporal reference picture of the current PU (i.e., Curr), the video coder may firstly scale the temporal motion vector to a first available temporal reference picture. The video coder may then use the scaled motion vector to locate two blocks in a different access unit (i.e., BaseRef and CurrRef).

In Zhang et al., "3D-CE4: Advanced residual prediction for multiview coding," Joint Collaborative Team on 3D Video Coding Extension Development of ITU-T SG 16 WP 3 and ISO/IEC JTC 1/SC 29/WG 11, 3rd Meeting: Geneva, CH, 17-23 Jan. 2013, document no. JCT3V-O0049, hereinafter "JCT3V-O0049," the reference pictures of PUs coded with non-zero weighting factors may be different from block to block. Therefore, different pictures from the reference view may need to be accessed to generate the motion-compensated block (i.e., BaseTRef in FIG. 4) of the corresponding block. When the weighting factor is unequal to 0, for temporal residual, the motion vectors of the current PU are scaled towards a fixed picture before performing motion compensation for both residual and residual predictor generation processes. When ARP is applied to inter-view residual, the temporal motion vectors of the reference block (i.e., Base in FIG. 4) is scaled towards a fixed picture before performing motion compensation for both residual and residual predictor generation processes. In JCT3V-C0049, for both cases (i.e., temporal residual or inter-view residual), the fixed picture is defined as the first available temporal reference picture of each reference picture list. When the decoded motion vector does not point to the fixed picture, the decoded motion vector is firstly scaled and then used to identify CurrTRef and BaseTRef. Such a reference picture used for ARP is called target ARP reference picture. When the current slice (i.e., the slice containing the current block) is a B slice, the target ARP reference picture is associated with the reference picture list. Therefore, two target ARP reference pictures may be used.

A video coder may perform an availability check for target ARP reference pictures. For instance, denote the target ARP reference picture associated with a reference picture list X (with X being 0 or 1) as "RpRefPicLX," and denote the picture in the view with a view order index equal to the view order index derived from an NBDV process, and with the same POC value of RpRefPicLX as "RefPicInRefViewLX." When one of the following conditions is false, ARP is disabled for reference picture list X:
  RpRefPicLX is unavailable.
  RefPicInRefViewLX is not stored in decoded picture buffer.
  RefPicInRefViewLX is not included in any of the reference picture lists of the corresponding block (i.e., Base in FIG. 4 and FIG. 6) located by the disparity vector from the NBDV process or the DMV of (i.e., associated with) the current block.

In some implementations, when ARP is applied, a video coder always uses a bi-linear filter when generating the residual and residual predictor. That is, the three blocks, excluding the current block, involved in the ARP process are generated using a bi-linear filter (e.g., Base, BaseTRef, and CurrTRef in FIG. 4 and Base, BaseRef, and CurrRef in FIG. 6).

In HEVC version 1, to get a predictive block of one inter-coded PU, two steps are required:
  1) possible fractional interpolation with HEVC 8-tap/6-tap filters to determine the intermediate prediction signal with increased bit depth, (details can be found in sub-clause 8.5.3.3.3 of HEVC version 1).
  2) weighted sample prediction process wherein shifting the intermediate prediction signal back to original bit-depth precision and clipping operation are invoked to make sure there is no overflow (see sub-clause 8.5.3.3.4).

In general, the number of "taps" of a filter corresponds to the number of samples used to determine an output value of the filter.

In 3D-HEVC Draft Text 4, when ARP is applied, a video decoder uses a defined bilinear filtering process similar to H.264/AVC specification. The bilinear filtering process defined in 3D-HEVC Draft Text 4 for use with ARP results in an intermediate prediction signal in the same bit-depth as the input signal, i.e., 8-bit under common test conditions (CTC) used in 3D-HEVC coding tool performance evaluation. As described in sub-clause I.8.5.3.3.7.2 of 3D-HEVC Draft Text 4, the video decoder performs the bilinear filtering process using the following equation:

$$predPartLX[x][y]=(refPicLX[xA][yA]*(8-xFrac)*(8-yFrac)+refPicLX[xB][yB]*(8-yFrac)*xFrac+refPicLX[xC][yC]*(8-xFrac)*yFrac+refPicLX[xD][yD]*xFrac*yFrac)>>6 \quad (I-238)$$

However, followed by the filtering process, the weighted sample prediction process as in sub-clause 8.5.3.3.4 of HEVC version 1 is invoked and the right shifting operation (e.g., by 6 under CTC) causes the wrong prediction values. The following are some examples of the shifting operation in the weighted sample prediction process. The final prediction signal predSamples is defined as follows:
  For uni-predicted blocks in P slices with weighted_pred_flag equal to 0, the following applies:

$$predSamples[x][y]=Clip3(0,(1<<bitDepth)-1,$$

$$(predSamplesLX[x][y]+offset1)>>shift1)$$

wherein the predSamplesLX indicates the prediction signal which is the output of bilinear filtering process and shift1 is set equal to (14−bitDepth) and offset1 is equal to 1<<(shift1−1) when shift1 is unequal to 0. The final prediction signal is expected to have a right shift of 6 in CTC case to normalize the sum of the magnitudes of filter coefficients.

For bi-predicted blocks in B slices with weighted_bipred_flag equal to 0, the following applies:

predSamples[$x$][$y$]=Clip3(0,(1<<bitDepth)−1, (predSamples$L0$[$x$][$y$]+predSamples$L1$[$x$][$y$]+
    offset2)>>shift2)     (8-239)

In the equation above, shift2 is set equal to (15−bitDepth) and offset2 is equal to 1<<(shift2−1). The final prediction signal is expected to have a right shift of 7 in CTC case. The bi-linear interpolation of 3D-HEVC Draft Text 4 is done in a way that is similar to the non-separable filter as in equation 1-238.

The current design of 3D-HEVC Draft Text 4 has several problems. For example, the design of 3D-HEVC Draft Text 4 keeps a wrong precision of the bilinear motion compensated data, i.e., 8-bit when the input video is 8-bit. In another example, the reference software for 3D-HEVC Draft Text 4 clips all intermediate data at least for the uni-directional prediction case, since the current implementation reuses the HEVC interpolation function. This results in three times the number of clipping operations per pixel for uni-predicted ARP since three prediction blocks are generated with the interpolation process. The following equation describes the clipping:

predSamples$LX_L$[$x$][$y$]=clip$_y$(predSamples$LX_L$[$x$][$y$])+
    ((clip$y$($rp$Samples$LX_L$[$x$][$y$])−clip$_y$($rp$RefSam-
    ples$LX_L$[$x$][$y$]))>>shift$Val$)     (I-227)

This increased number of clipping operations may slow encoding and decoding speed and/or unnecessarily reduce the visual quality of decoded pictures.

The following techniques may be embodied independently or in combination, as would be apparent to those of skill in the art. In particular, examples may include any of the following aspects to address the above noted problems or otherwise improve coding performance. More specifically, examples may include one or more of the following ways of improving performance of ARP.

In one example technique involving ARP, a separable bilinear interpolation filter is configured to use the HEVC motion compensation interpolation scheme of HEVC version 1, by changing the coefficients, such that the sum of coefficients of the filter (a, b) of each phase adds up equal to 64, the same as the sum of the other interpolation filters used in HEVC version 1. In this example, (a, b) can be equal to (x*8, (8−x)*8), with the integer x being equal to a value in a range of 0 through 8.

The term "separable filter" applies to a filter that can be written as a product of two or more filters. In contrast, a non-separable filter cannot be written as a product of two or more filters. In the case of the bilinear interpolation filter used in some techniques of this disclosure, the bilinear interpolation filter is "separable" in that a first filter is applied to determine values of samples at primary sub-integer locations. The primary sub-integer locations are strictly vertical or horizontal from integer pixel locations. A second filter is applied to samples at primary sub-integer locations to determine values of samples at secondary sub-integer locations. The secondary sub-integer locations are not strictly vertical or horizontal from integer pixel locations. In this context, the term "phase" refers to a sub-integer location.

The use of the separable bilinear interpolation filter when applying ARP may reduce the number of clipping operations performed when applying the bilinear interpolation filter. Furthermore, because the coefficients used in the interpolation filters for each sub-integer location (i.e., phase) sum to 64, the bilinear interpolation filter used when applying ARP may allow reuse of the bilinear interpolation filter hardware used in base HEVC for motion compensation.

Accordingly, in a uni-directional ARP example, video encoder 20 may determine, based on a motion vector of a current block in a current picture of the video data, a location of a first reference block in a first reference picture. In the example of FIG. 4, the first reference block is labeled CurrTRef. In the example of FIG. 6, the first reference block is labeled Base. Video encoder 20 applies a separable bilinear interpolation filter to samples of the first reference picture to determine samples of the first reference block. Furthermore, in this uni-directional ARP example, video encoder 20 determines a location of a second reference block in a second reference picture. In the example of FIG. 4, the second reference block is labeled BaseTRef. In the example of FIG. 6, the second reference block is labeled CurrRef. Furthermore, in this example, video encoder 20 may apply a separable bilinear interpolation filter to samples of the first reference picture to determine samples of the first reference block. Video encoder 20 applies the same or different separable bilinear interpolation filter to samples of the second reference picture to determine samples of the second reference block. Video encoder 20 applies the same or different separable bilinear interpolation filter to samples of a third reference picture to determine samples of a third reference block. In the example of FIG. 4, the third reference block is labeled Base. In the example of FIG. 6, the third reference block is labeled BaseRef.

In this example, video encoder 20 determines a predictive block. Each respective sample of the predictive block may be equal to a respective sample of the first reference block minus a respective residual predictor sample. In this example, the respective residual predictor sample may be equal to a weighting factor (e.g., a non-zero weighting factor) multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block. Additionally, in this example, video encoder 20 determines a residual block. In this example, each respective sample of the residual block is equal to a difference between a respective sample of the current block and a respective sample of the predictive block. The respective sample of the current block and the respective sample of the predictive block correspond to a location of the respective sample of the residual block. Video encoder 20 includes, in a bitstream, data representing the residual block.

In a similar example, video decoder 30 determines, based on a motion vector of a current block in a current picture of video data, a location of a first reference block in a first reference picture. Video decoder 30 may apply a separable bilinear interpolation filter to samples of the first reference picture to determine samples of the first reference block. In the example of FIG. 4, the second reference block is labeled CurrTRef. In the example of FIG. 6, the second reference block is labeled Base. Additionally, in this example, video decoder 30 determines a location of a second reference block in a second reference picture. In the example of FIG. 4, the second reference block is labeled BaseTRef. In the example of FIG. 6, the third reference block is labeled CurrRef. In this example, video decoder 30 applies a separable bilinear interpolation filter to samples of the second reference picture to determine samples of the second reference block. Video decoder 30 applies the separable bilinear interpolation filter to samples of a third reference picture to determine samples of a third reference block. In the example of FIG. 4, the third reference block is labeled Base. In the example of FIG. 6, the third reference block is labeled BaseRef.

Furthermore, in this example, video decoder 30 determines a predictive block. Each respective sample of the predictive block is equal to a respective sample of the first reference block plus a respective residual predictor sample. In this example, the respective residual predictor sample is equal to a weighting factor multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block. In this example, video decoder 30 obtains, from a bitstream, data representing a residual block. Video decoder 30 reconstructs, based in part on the residual block and the predictive block, a coding block of the current picture.

In some examples in accordance with the examples for video encoder 20 and video decoder 30 provided above, a sum of coefficients of the separable bilinear interpolation filter of each phase is equal to 64. In such examples, a sum of coefficients (a, b) of the separable bilinear interpolation filter are equal to (x*8, (8−x)*8), with x being equal to a value in a range of 0 through 8.

Furthermore, in accordance with the examples for video encoder 20 and video decoder 30 provided above, video encoder 20 and video decoder 30 may use ARP for temporal residual. In an example where video encoder 20 and video decoder 30 use ARP for temporal residual, the current picture (i.e., current picture 70 in FIG. 4) is in a first view (i.e., V0 in FIG. 4). The second reference picture (i.e., reference picture 76) and the third reference picture (i.e., reference picture 74) are both in a second view (i.e., V1 in FIG. 4) different from the first view. Furthermore, in this example, the motion vector of the current block is a temporal motion vector of the current block (i.e., TMV). A POC value (i.e., T0 in FIG. 4) of the third reference picture is equal to a POC value of the current picture. In this example, a video coder (e.g., video encoder 20 and/or video decoder 30) may determine the first reference picture (i.e., reference picture 72). A POC value (i.e., T1) of the first reference picture is equal to the POC value of the second reference picture. The video coder may determine the first reference picture based on a reference index of the motion information of the current block. The POC value of the first reference picture and the POC value of the second reference picture are different from the POC value of the current picture. Furthermore, in this example, the video coder determines, based on a disparity vector (i.e., DV) of the current block, a location of the third reference block (i.e., Base). In this example, the video coder determines the location of the second reference block (i.e., BaseTRef) such that the location of the second reference block is indicated by a sum of the temporal motion vector of the current block and the disparity vector of the current block.

In another example where video encoder 20 and video decoder 30 use ARP for inter-view residual, the current picture (e.g., current picture 100 in FIG. 6) and the second reference picture (e.g., reference picture 106 in FIG. 6) are both in a first view (e.g., V0 in FIG. 6). In this example, the third reference picture (e.g., reference picture 102 in FIG. 6) is in a second view (e.g., V1 in FIG. 6) different from the first view. Furthermore, in this example, the motion vector of the current block is a disparity motion vector of the current block. A POC value of the second reference picture (e.g., T1 in FIG. 6) is different from a POC value of the current picture (e.g., T0 in FIG. 6). A POC value of the third reference picture (e.g., T0 in FIG. 6) is different from the POC value of the current picture and equal to the POC value of the second reference picture. In this example, a video coder (e.g., video encoder 20 and/or video decoder 30) determines, based on the disparity motion vector of the current block, the first reference block (e.g., Base in FIG. 6). The first reference picture has the same POC value (e.g., T0 in FIG. 6) as the current picture and is in the second view (e.g., V1 in FIG. 6). In this example, the video coder determines a location of the third reference block (e.g., BaseRef in FIG. 6) such that the location of the third reference block is indicated by a temporal motion vector of the first reference block. Furthermore, in such examples, the video coder determines the location of the second reference block (e.g., CurrRef in FIG. 6) by reusing the temporal motion vector of the reference block to determine the location of the second reference block. For instance, in some examples, the video coder may determine the location of the second reference block such that the location of the second reference block is indicated by location coordinates of the third reference block (e.g., BaseRef in FIG. 6) minus the disparity motion vector of the current block. In some examples, the video coder may determine the location of the second reference block such that the location of the second reference block is indicated by location coordinates of the temporal motion vector of the first reference block.

In another example technique involving ARP, regardless of whether a separable bilinear interpolation filter is used or a non-separable bilinear interpolation filter is used as in 3D-HEVC Draft Text 4, results of the motion compensation may be arranged in a way that the results can be normalized by a right shift of (14−bitDepth), to be aligned with a weighted sample prediction process, e.g., the equation (8-239) as in sub-clause 8.5.3.3.4 of HEVC version 1. In this example, bitDepth is the bit depth of the current component.

In one alternative example, if separable bilinear filters are used, coefficients of the filter (a, b) of each phase add up equal to 64. Alternatively, the coefficients of the filter (a, b) of each phase is added up equal to 8, however, the shift values after second rough filtering (vertical) may need to be changed to a smaller value, here the shift values are changed from 6 to 0. In another alternative example, if non-separable bilinear filters are used as in 3D-HEVC Draft Text 4, interpolation is altered such that, instead of right shift of 6 as in 3D-HEVC Draft Text 4, a right shift of (bitDepth-8) is used.

In some examples, including the above examples, which may involve relatively high bit-depth for the motion compensated intermediate signal during the ARP, no clipping is performed for those intermediate signals regardless of whether uni-directional prediction or bi-directional prediction is used. For example, the clipping operation may be performed only in the weighted sample prediction process in HEVC version 1. Alternatively, in order to keep the residual predictor, which is a subtraction potentially between two bilinear interpolation based motion compensation signals, with the range of 16-bit, a clipping of the residual predictor may apply to make the clipped data in the range of $[-2^{15}, 2^{15}-1]$. The two values $-2^{15}$, $2^{15}-1$ indicate the minimum and maximum values after the clipping (inclusive), thus uniquely defining the clipping function.

Illumination compensation (IC) in the multi-view video coding is used for compensating illumination discrepancies between different views because each camera may have different exposure to a light source. Typically, a weight factor and/or an offset are used to compensate the differences between a coded block and a prediction block in a different view. The parameters may or may not be explicitly transmitted to a video decoder.

According to a design proposed in Liu et al., "3D-CE2.h: Results of Illumination compensation for inter-view prediction," Joint Collaborative Team on 3D Video Coding Extension Development of ITU-T SG 16 WP 3 and ISO/IEC JTC 1/SC 29/WG 11, 2nd Meeting:Shanghai, CN, 13-19 Oct. 2012, document JCT3V-B0045 (hereinafter "JCT3V-B0045") illumination compensation is signaled at the CU level and the parameters are derived by neighboring samples of a current block as those of a reference block. Later, the signaling of the mode was changed, as proposed in Ikai et al., "3D-CE5.h: Removal of parsing dependency for illumination compensation," Joint Collaborative Team on 3D Video Coding Extensions of ITU-T SG 16 WP 3 and ISO/IEC JTC 1/SC 29/WG 11, 4th Meeting: Incheon, KR, 20-26 Apr. 2013, document JCT3V-D0060 (hereinafter, "JCT3V-D0060").

Illumination compensation was introduced to improve the coding efficiency for blocks predicted from inter-view reference pictures. Therefore, illumination compensation may only apply to blocks predicted by an inter-view reference picture. Hence, for a current PU, its neighboring samples in the top neighboring row and left neighboring column, together with the corresponding neighboring samples of the reference block are the input parameters for a linear model. The linear model may derive a scaling factor a and an offset b by a least squares solution. The corresponding neighboring samples in the reference view are identified by a disparity motion vector of the current PU, as shown in FIG. 7.

After motion compensation from an inter-view reference picture, the linear model is applied to each value of the prediction block to update the prediction signal for the current PU. Each value of the prediction block is further scaled with a and further added with b, as shown in FIG. 7. AMVP and Merge modes in the illumination compensation can be adaptively enabled or disabled at a slice level so as to reduce extra bits and unnecessary computations.

Figure 7:
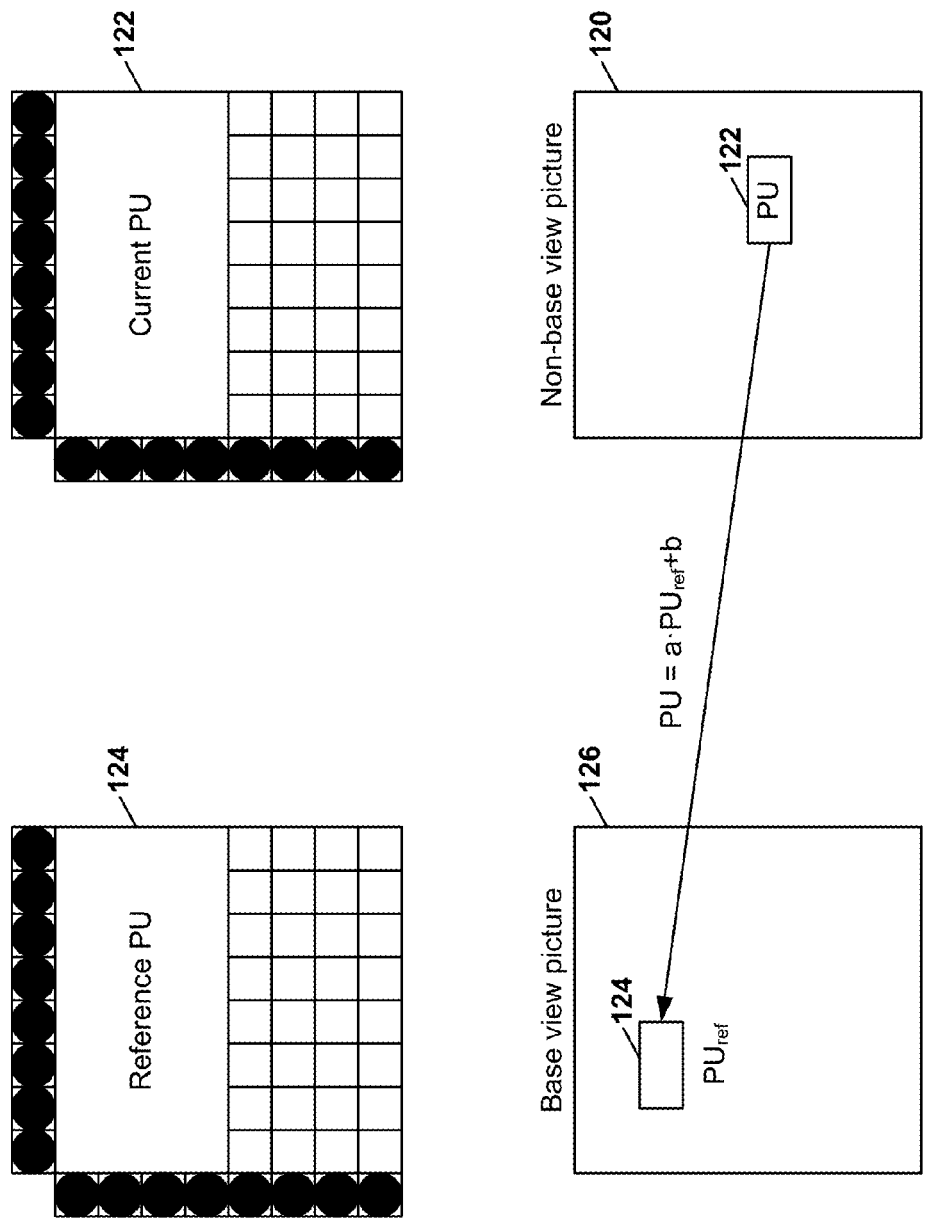
FIG. 7 is a conceptual diagram illustrating example neighboring samples for the derivation of illumination compensation parameters.

FIG. 7 is a conceptual diagram illustrating example neighboring samples for the derivation of illumination compensation (IC) parameters. In the example of FIG. 7, a non-base view picture 120 includes a current PU 122. A video coder uses a disparity motion vector of current PU 122 to determine a reference PU 124 in a base view picture 126. The video coder determines scaling factor a and offset b based on the neighboring samples of current PU 122 and the neighboring samples of reference PU 124. In the example of FIG. 7, the neighboring samples are shown as circles enclosed by squares. For each respective sample of a predictive block for current PU 122, the video coder may set the respective sample to a value equal to a respective corresponding sample of reference PU 124 scaled by the scaling factor a plus the offset b.

In 3D-HEVC Draft Text 4, when IC is enabled for a bi-directionally predicted PU, four additional clippings are required for each pixel when compared with HEVC. Specifically, for each prediction direction, both motion compensated samples and illumination compensated samples are clipped to $[0, (1<<BitDepth)-1]$, where BitDepth is the bit depth of the current component.

Denote PredMcLX[x] and IcPredLX[x] as a motion compensated sample and a IC sample at position x from prediction direction X respectively, with X equal to 0 or 1. Denote aLX and bLX as IC parameters of a current PU in prediction direction X, respectively. Set shift1 equal to 14−BitDepth, set offset1 equal to 1<<(shift1−1), set shift2 equal to 15−BitDepth and set offset2 equal to 1<<(shift2−1). Denote Pred[x] as the final prediction sample at position x. Pred[x] may be generated according to the following steps:

1. Step 1: Clipping of motion compensated sample.

$$\text{Pred}McLX[x]=\text{clip3}(0,(1<<\text{BitDepth})-1,(\text{Pred}McLX[x]+\text{offset1})>>\text{shift1}) \quad (1)$$

2. Step 2: Generation and clipping of illumination compensated sample.

$$Ic\text{Pred}LX[x]=aLX*\text{Pred}McLX[x]+bLX \quad (2)$$

$$Ic\text{Pred}LX[x]=\text{clip3}(0,(1<<\text{BitDepth})-1,Ic\text{Pred}McLX[x]) \quad (3)$$

3. Step 3: Set the signal before weighted sample prediction process (editorial remark so that equation (5) and (6) look identical as equation (7) and (8)).

$$\text{Pred}LX[x]=Ic\text{Pred}McLX[x] \quad (4)$$

4. Weighted sample prediction process.
   a. If current PU is uni-directionally predicted from direction X, $$\text{Pred}[x]=\text{clip3}(0,(1<<\text{BitDepth})-1,(\text{Pred}L0[x]+\text{offset1})>>\text{shift1}) \quad (5)$$

b. If current PU is bi-directionally predicted, $$\text{Pred}[x]=\text{clip3}(0,(1<<\text{BitDepth})-1,(Ic\text{Pred}L0[x]+k\text{Pred}L1[x]+\text{offset2})>>\text{shift2}) \quad (6)$$

In the steps above, one clipping operation is needed in both step 1 and step 2 for each prediction direction, and one clipping operation is needed in step 3 for the bi-prediction case. To summarize, five clippings and two clippings are required for bi-directional prediction and uni-directional prediction respectively, when IC is enabled.

However, in the bi-prediction case, because Pred[x] is clipped to $[0, (1<<BitDepth)-1]$ in step 4, it is not necessary to additionally clip the intermediate results, i.e., the motion compensated sample and the illumination compensated sample, to $[0, (1<<BitDepth)-1]$ in step 1 and step 2. Likewise, in the uni-prediction case, because IcPredLX[x] is clipped to $[0, (1<<BitDepth)-1]$ in step 2, it is not necessary to additionally clip the motion compensated samples in step 1.

When IC is disabled, Pred[x] may be generated as:
1. If current PU is uni-directionally predicted from direction X, $$\text{Pred}[x]=\text{clip3}(0,(1<<\text{BitDepth})-1,(\text{Pred}L0[x]+\text{offset1})>>\text{shift1}) \quad (7)$$

2. If current PU is bi-directionally predicted $$\text{Pred}[x]=\text{clip3}(0,(1<<\text{BitDepth})-1,(\text{Pred}L0[x]+\text{Pred}L1[x]+\text{offset2})>>\text{shift2}) \quad (8)$$

Thus, when IC is disabled, only one clipping operation is required for both bi-directional prediction and uni-directional prediction.

From above analysis, up to four additional clipping operations are required when IC is enabled, which is very complex and unnecessary. Each clipping operation requires at least two comparisons and for each e.g., 8×8 block, the number of comparisons is 192. Thus, in IC, an unnecessary number of clippings are performed. For example, four additional clippings are in case of bi-directional prediction IC. This increased number of clipping operations may slow encoding and decoding speed.

Particular techniques of this disclosure reduce clipping operations involved in IC. For instance, in accordance with a technique of this disclosure, in IC, all the above mentioned clippings in step 1 and 2, equation (1) and (3) are removed. In another example, in IC, the clipping operation applied to the motion compensated signal is applied, as in step 1 of equation (1). However, in this example, the clipping operation on top of the IC signal, as in step 2, equation (3) is applied, so that the IC signal is within the range of $[0, 2^{16}-1]$. The two values $0, 2^{16}-1$ indicate the minimum and maximum values after the clipping (inclusive), and thus uniquely define the clipping function.

To disable application of IC to weighted prediction, in some examples of the weighted prediction process, whether IC is enabled or not can be checked, such that weighted prediction does not apply to the IC compensated block. Alternatively, a constraint may be enforced when implicit weighted prediction applies with weights being not equal to (1, 0), (0, 1) or (0.5, 0.5), e.g., indicated by weightedPredFlag equal to 1, such that the IC is disabled for the whole slice, i.e., slice_ic_enable_flag shall be equal to 1.

Figure 8:
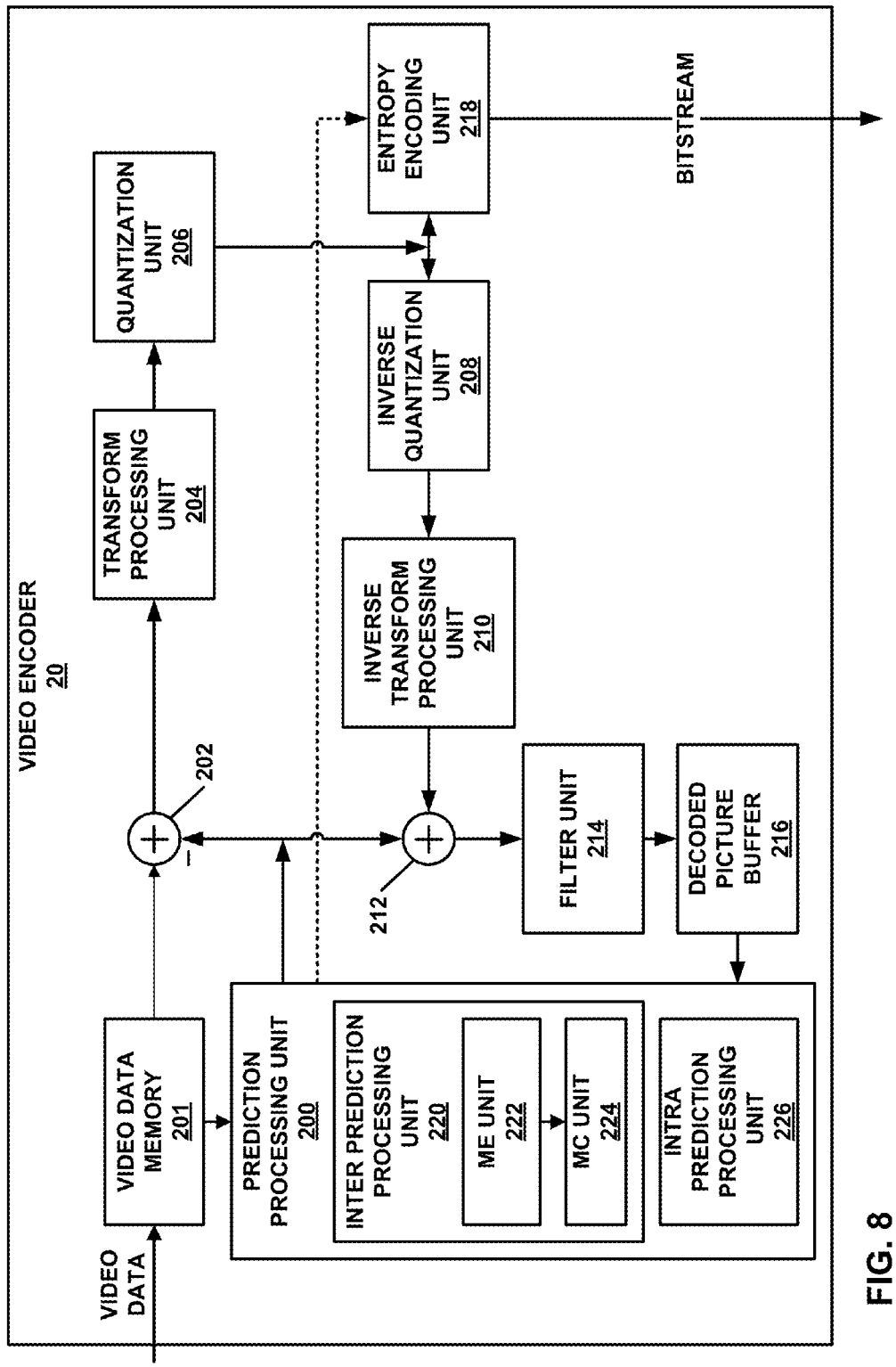
FIG. 8 is a block diagram illustrating an example video encoder that may implement techniques of this disclosure.

FIG. 8 is a block diagram illustrating an example video encoder 20 that may implement techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 8, video encoder 20 includes a prediction processing unit 200, a residual generation unit 202, a transform processing unit 204, a quantization unit 206, an inverse quantization unit 208, an inverse transform processing unit 210, a reconstruction unit 212, a filter unit 214, a decoded picture buffer 216, and an entropy encoding unit 218. Prediction processing unit 200 includes an inter prediction processing unit 220 and an intra prediction processing unit 226. Inter prediction processing unit 220 includes a motion estimation unit 222 and a motion compensation unit 224. In other examples, video encoder 20 may include more, fewer, or different functional components.

Video encoder 20 receives video data. Video data memory 201 stores video data to be encoded by the components of video encoder 20. The video data stored in video data memory 201 may be obtained, for example, from video source 18. Decoded picture buffer 216 may be a reference picture memory that stores reference video data for use in encoding video data by video encoder 20, e.g., in intra- or inter-coding modes. Video data memory 201 and decoded picture buffer 216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 201 and decoded picture buffer 216 may be provided by the same memory device or separate memory devices. In various examples, video data memory 201 may be on-chip with other components of video encoder 20, or off-chip relative to those components.

Video encoder 20 may encode each CTU in a slice of a picture of the video data. Thus, for each respective CTU of the slice, video encoder 20 generates respective encoded data representing the respective CTU. Each of the CTUs may be have equally-sized luma coding tree blocks (CTBs) and corresponding CTBs of the picture. As part of encoding a CTU, prediction processing unit 200 may perform quadtree partitioning to divide the CTBs of the CTU into progressively-smaller blocks. The smaller blocks may be coding blocks of CUs. For example, prediction processing unit 200 may partition a CTB of a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). Otherwise stated, for each respective CU of the CTU, video encoder 20 generates respective encoded data representing the respective CU. As part of encoding a CU, prediction processing unit 200 may partition the coding blocks of the CU among one or more PUs of the CU. Thus, each PU may have a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter prediction processing unit 220 may generate predictive data for a PU by performing inter prediction on each PU of a CU. The predictive data for the PU may include predictive blocks of the PU and motion information for the PU. Inter prediction processing unit 220 may perform different operations for a PU of a CU depending on whether the PU is in an I slice, a P slice, or a B slice. In an I slice, all PUs are intra predicted. Hence, if the PU is in an I slice, inter prediction processing unit 220 does not perform inter prediction on the PU.

If a PU is in a P slice, motion estimation unit 222 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 222 may generate a reference index that indicates a position in RefPicList0 of the reference picture containing the reference region for the PU. In addition, motion estimation unit 222 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 222 may output the reference index and the motion vector as the motion information of the PU. Motion compensation unit 224 may generate the predictive blocks of the PU based on actual or interpolated samples at the reference location indicated by the motion vector of the PU.

If a PU is in a B slice, motion estimation unit 222 may perform uni-prediction or bi-prediction for the PU. To perform uni-prediction for the PU, motion estimation unit 222 may search the reference pictures of RefPicList0 or a second reference picture list ("RefPicList1") for a reference region for the PU. Motion estimation unit 222 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 224 may generate the predictive blocks of the PU based at least in part on actual or interpolated samples at the reference location indicated by the motion vector of the PU.

To perform bi-directional inter prediction for a PU, motion estimation unit 222 may search the reference pictures in RefPicList0 for a reference region for the PU and may also search the reference pictures in RefPicList1 for another reference region for the PU. Motion estimation unit 222 may generate reference indexes that indicate positions in RefPicList0 and RefPicList1 of the reference pictures that contain the reference regions. In addition, motion estimation unit 222 may generate motion vectors that indicate spatial displacements between the reference locations associated with the reference regions and a prediction block of the PU. The motion information of the PU may include the reference indexes and the motion vectors of the PU. Motion compensation unit 224 may generate the predictive blocks of the PU based at least in part on actual or interpolated samples at the reference locations indicated by the motion vectors of the PU.

Intra prediction processing unit 226 may generate predictive data for a PU by performing intra prediction on the PU. The predictive data for the PU may include predictive blocks for the PU and various syntax elements. Intra prediction processing unit 226 may perform intra prediction on PUs in I slices, P slices, and B slices.

To perform intra prediction on a PU, intra prediction processing unit 226 may use multiple intra prediction modes to generate multiple sets of predictive blocks for the PU. When performing intra prediction using a particular intra prediction mode, intra prediction processing unit 226 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra prediction processing unit 226 may use various numbers of intra prediction modes, e.g., 33 directional intra prediction modes. In some examples, the number of intra prediction modes may depend on the size of the prediction blocks of the PU.

Prediction processing unit 200 may select the predictive data for PUs of a CU from among the predictive data generated by inter prediction processing unit 220 for the PUs or the predictive data generated by intra prediction processing unit 226 for the PUs. In some examples, prediction processing unit 200 selects the predictive data for the PUs of the CU based on rate/distortion metrics of the sets of predictive data. The predictive blocks of the selected predictive data may be referred to herein as the selected predictive blocks.

Prediction processing unit 200 may perform ARP to generate predictive blocks for PUs. In accordance with an example technique of this disclosure, prediction processing unit 200 determines, based on a motion vector of a current PU in a current picture, a location of a first reference block in a first reference picture. This first reference block may be a predictive block determined by motion compensation unit 224. In this example, prediction processing unit 200 determines a location of a second reference block in a second reference picture. Furthermore, in this example, prediction processing unit 200 applies a separable bilinear interpolation filter to samples of the second reference picture to determine samples of the second reference block. Additionally, in this example, prediction processing unit 200 applies the separable bilinear interpolation filter to samples of a third reference picture to determine samples of a third reference block. In this example, prediction processing unit 200 determines a predictive block. Each respective sample of the predictive block is equal to a respective sample of the first reference block minus a respective residual predictor sample. In this example, the respective residual predictor sample is equal to a weighting factor multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block.

Residual generation unit 202 may generate, based on the coding blocks of a CU and the selected predictive blocks of the PUs of the CU, residual blocks of the CU. For example, residual generation unit 202 may generate, based on the luma, Cb and Cr coding block of a CU and the selected predictive luma, Cb and Cr blocks of the PUs of the CU, luma, Cb and Cr residual blocks of the CU. In some examples, residual generation unit 202 may generate the residual blocks of the CU such that each sample in the residual blocks has a value equal to a difference between a sample in a coding block of the CU and a corresponding sample in a corresponding selected predictive block of a PU of the CU.

Transform processing unit 204 may perform quad-tree partitioning to partition the residual blocks of a CU into transform blocks of TUs of the CU. Thus, a TU may have a luma transform block and two corresponding chroma transform blocks. The sizes and positions of the transform blocks of TUs of a CU may or may not be based on the sizes and positions of prediction blocks of the PUs of the CU.

Transform processing unit 204 may generate transform coefficient blocks for each TU of a CU by applying one or more transforms to the transform blocks of the TU. Transform processing unit 204 may apply various transforms to a transform block of a TU. For example, transform processing unit 204 may apply a discrete cosine transform (DCT), a directional transform, or a conceptually-similar transform to a transform block. In some examples, transform processing unit 204 does not apply transforms to a transform block. In such examples, the transform block may be treated as a transform coefficient block.

Quantization unit 206 may quantize the transform coefficients in a transform coefficient block. The quantization process may reduce the bit depth of some or all of the transform coefficients. For example, an n-bit transform coefficient may be rounded down to an m-bit transform coefficient during quantization, where n is greater than m. Quantization unit 206 may quantize a transform coefficient block of a TU of a CU based on a quantization parameter (QP) value for the CU. Video encoder 20 may adjust the degree of quantization applied to the transform coefficient blocks of a CU by adjusting the QP value for the CU. Quantization may introduce loss of information, thus quantized transform coefficients may have lower precision than the original ones.

Inverse quantization unit 208 and inverse transform processing unit 210 may apply inverse quantization and inverse transforms to a transform coefficient block, respectively, to reconstruct a residual block from the transform coefficient block. Reconstruction unit 212 may add the reconstructed residual block to corresponding samples from one or more predictive blocks generated by prediction processing unit 200 to produce a reconstructed transform block of a TU. By reconstructing transform blocks for each TU of a CU in this way, video encoder 20 may reconstruct the coding blocks of the CU.

Filter unit 214 may perform one or more deblocking operations to reduce blocking artifacts in the coding blocks of a CU. Decoded picture buffer 216 may store the reconstructed coding blocks after filter unit 214 performs the one or more deblocking operations on the reconstructed coding blocks. Inter prediction processing unit 220 may use a reference picture that contains the reconstructed coding blocks to perform inter prediction on PUs of other pictures. In addition, intra prediction processing unit 226 may use reconstructed coding blocks in decoded picture buffer 216 to perform intra prediction on other PUs in the same picture as the CU.

Entropy encoding unit 218 may receive data from other functional components of video encoder 20. For example, entropy encoding unit 218 may receive transform coefficient blocks from quantization unit 206 and may receive syntax elements from prediction processing unit 200. Entropy encoding unit 218 may perform one or more entropy encoding operations on the data to generate entropy-encoded data. For example, entropy encoding unit 218 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 218.

Figure 9:
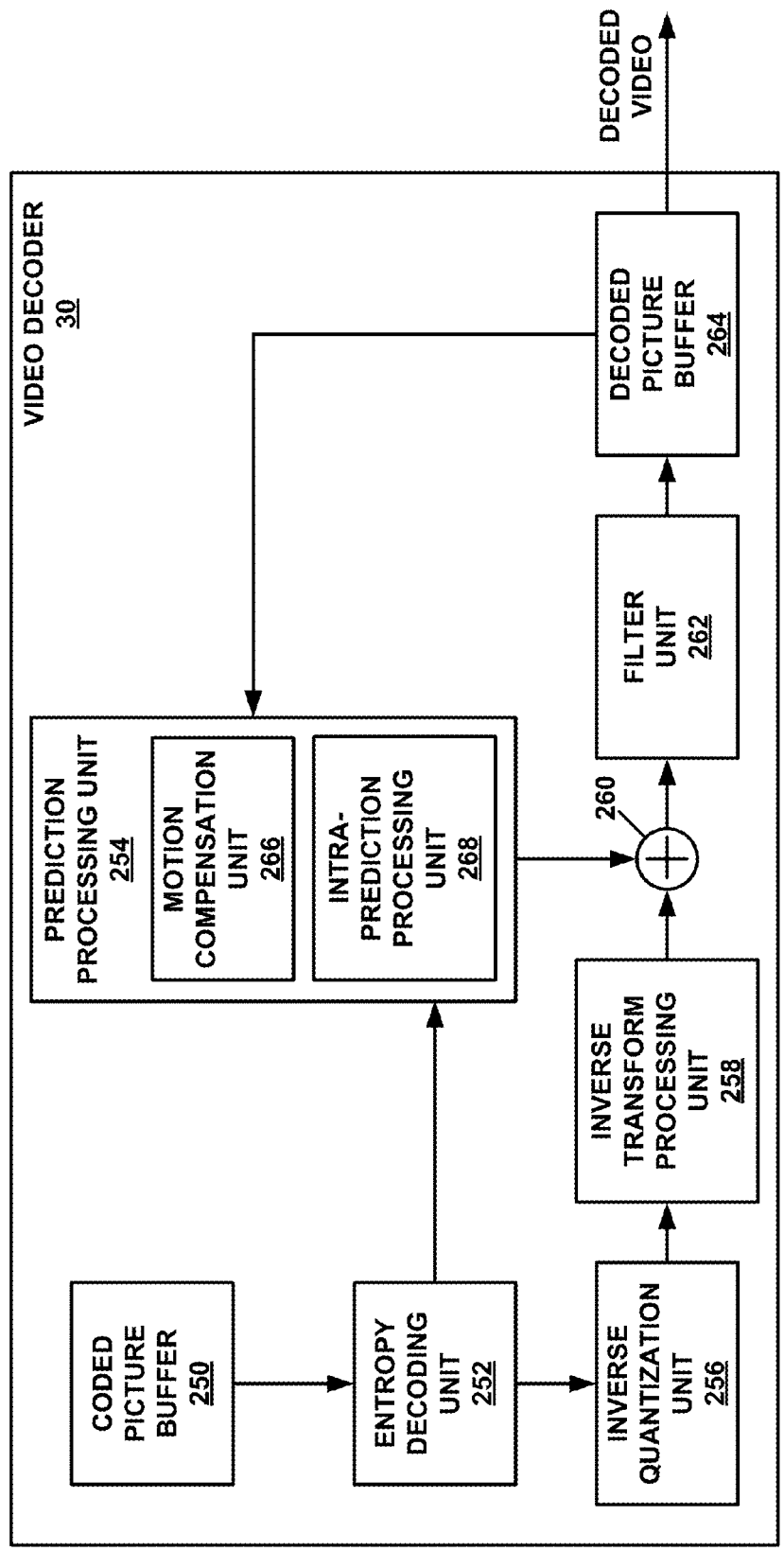
FIG. 9 is a block diagram illustrating an example video decoder that may implement techniques of this disclosure.

FIG. 9 is a block diagram illustrating an example video decoder 30 that may implement techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an a coded picture buffer 250, an entropy decoding unit 252, a prediction processing unit 254, an inverse quantization unit 256, an inverse transform processing unit 258, a reconstruction unit 260, a filter unit 262, and a decoded picture buffer 264. Prediction processing unit 254 includes a motion compensation unit 266 and an intra prediction processing unit 268. In other examples, video decoder 30 may include more, fewer, or different functional components.

CPB 250 receives and stores encoded video data (e.g., NAL units) of a bitstream. The video data stored in CPB 250 may be obtained, for example, from channel 16, e.g., from a local video source, such as a camera, via wired or wireless network communication of video data, or by accessing physical data storage media. CPB 250 may form a video data memory that stores encoded video data from an encoded video bitstream. Decoded picture buffer 264 may be a reference picture memory that stores reference video data for use in decoding video data by video decoder 30, e.g., in intra- or inter-coding modes. CPB 250 and decoded picture buffer 264 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 250 and decoded picture buffer 264 may be provided by the same memory device or separate memory devices. In various examples, CPB 250 may be on-chip with other components of video decoder 30, or off-chip relative to those components.

Entropy decoding unit 252 may receive NAL units from CPB 250 and parse the NAL units to obtain syntax elements from the bitstream. Entropy decoding unit 252 may entropy decode entropy-encoded syntax elements in the NAL units. Prediction processing unit 254, inverse quantization unit 256, inverse transform processing unit 258, reconstruction unit 260, and filter unit 262 may generate decoded video data based on the syntax elements obtained from the bitstream.

The NAL units of the bitstream may include coded slice NAL units. As part of decoding the bitstream, entropy decoding unit 252 may entropy decode syntax elements from the coded slice NAL units. Each of the coded slices may include a slice header and slice data. The slice header may contain syntax elements pertaining to a slice.

In addition to obtaining syntax elements from the bitstream, video decoder 30 may perform a decoding operation on a CU. By performing the decoding operation on a CU, video decoder 30 may reconstruct coding blocks of the CU. As part of performing a decoding operation on a CU, inverse quantization unit 256 may inverse quantize, i.e., de-quantize, coefficient blocks of TUs of the CU. Inverse quantization unit 256 may use a QP value for the CU of the TU to determine a degree of quantization and, likewise, a degree of inverse quantization for inverse quantization unit 256 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 256 inverse quantizes a coefficient block, inverse transform processing unit 258 may apply one or more inverse transforms to the coefficient block in order to generate a residual block for the TU. For example, inverse transform processing unit 258 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra prediction processing unit 268 may perform intra prediction to generate predictive blocks for the PU. For example, intra prediction processing unit 268 may perform intra prediction to generate luma, Cb, and Cr predictive blocks for the PU. Intra prediction processing unit 268 may use an intra prediction mode to generate the predictive blocks for the PU based on the prediction blocks of spatially-neighboring PUs. Intra prediction processing unit 268 may determine the intra prediction mode for the PU based on one or more syntax elements obtained from the bitstream.

Prediction processing unit 254 may construct a first reference picture list (RefPicList0) and a second reference picture list (RefPicList1) based on syntax elements extracted from the bitstream. Furthermore, if a PU is encoded using inter prediction, motion compensation unit 254 may determine, based on syntax elements obtained from the bitstream by entropy decoding unit 252, motion information for the PU. Motion compensation unit 266 may determine, based on the motion information of the PU, one or more reference regions for the PU. Motion compensation unit 266 may generate, based on samples at the one or more reference blocks for the PU, predictive blocks for the PU. For example, motion compensation unit 266 may generate, based on samples of the one or more reference blocks for the PU, luma, Cb, and Cr predictive blocks for the PU.

Prediction processing unit 254 may perform ARP to determine predictive blocks for PUs. In accordance with an example technique of this disclosure, prediction processing unit 254 determines, based on a motion vector of a current block in a current picture of the video data, a location of a first reference block in a first reference picture. This first reference block may be a predictive block generated by motion compensation unit 266. Furthermore, in this example, prediction processing unit 254 determines a location of a second reference block in a second reference picture. In this example, prediction processing unit 254 applies a separable bilinear interpolation filter to samples of the second reference picture to determine samples of the second reference block. Additionally, prediction processing unit 254 applies the separable bilinear interpolation filter to samples of a third reference picture to determine samples of a third reference block. In this example, prediction processing unit 254 determines a predictive block. Each respective sample of the predictive block is equal to a respective sample of the first reference block minus a respective residual predictor sample. In this example, the respective residual predictor sample is equal to a weighting factor multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block.

Reconstruction unit 260 may use the residual values from the transform blocks of TUs of a CU and predictive blocks of PUs of the CU to reconstruct coding blocks of the CU. For example, reconstruction unit 260 may use residual values from luma, Cb, and Cr transform blocks of TUs of a CU and the predictive luma, Cb, and Cr blocks of the PUs of the CU to reconstruct the luma, Cb, and Cr coding blocks of the CU. For example, reconstruction unit 260 may add samples of transform blocks to corresponding samples of the predictive blocks to reconstruct the coding blocks of the CU.

Filter unit 262 may perform a deblocking operation to reduce blocking artifacts associated with the coding blocks of the CU. Video decoder 30 may store the coding blocks of the CU in decoded picture buffer 264. Decoded picture buffer 264 may provide reference pictures for subsequent motion compensation, intra prediction, and presentation on a display device, such as display device 32 of FIG. 1. For instance, video decoder 30 may perform, based on the blocks in decoded picture buffer 264, intra prediction or inter prediction operations on PUs of other CUs. In this way, video decoder 30 may obtain, from the bitstream, transform coefficient levels of a coefficient block, inverse quantize the transform coefficient levels, apply a transform to the transform coefficient levels to generate a transform block, generate, based at least in part on the transform block, a coding block, and output the coding block for display.

Figure 10:
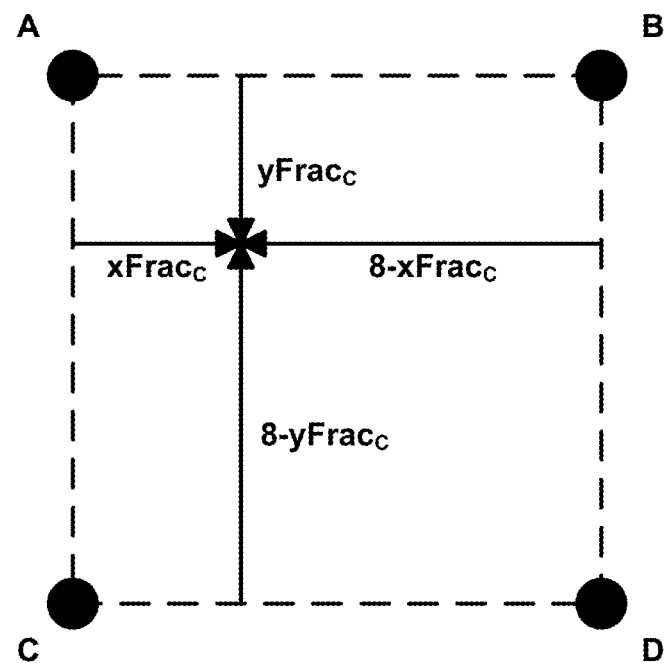
FIG. 10 is a conceptual diagram illustrating fractional sample position dependent variables in bi-linear interpolation and surrounding integer position samples.

As indicated above, in some example techniques of this disclosure, a video coder is configured to use a separable bilinear interpolation filter when determining reference blocks in ARP. The following text shows example changes to 3D-HEVC Draft Text 4 (i.e., document JCT3V-H1001_v2) to implement such example techniques. In the following text, italicized text shown in square brackets is text deleted from 3D-HEVC Draft Text 4. Underlined text is text added to 3D-HEVC Draft Text 4. Furthermore, Figure I-1 mentioned in the text below is reproduced as FIG. 10 of this disclosure. FIG. 10 is a conceptual diagram illustrating fractional sample position dependent variables in bi-linear interpolation and surrounding integer position samples. Figure x-x mentioned in the text below is reproduced as FIG. 11 of this disclosure.

I.8.5.3.3.7.1 Bilinear Sample Interpolation Process

The specifications in subclause 8.5.3.3.3.1 apply with the following modifications:

All invocations of the process specified in subclause 8.5.3.3.3.2 are replaced with invocations of the process specified in subclause I.8.5.3.3.7.2 with chromaFlag equal to 0 as additional input.

All invocations of the process specified in subclause 8.5.3.3.3.3 are replaced with invocations of the process specified in subclause I.8.5.3.3.7.2 with chromaFlag equal to 1 as additional input.

I.8.5.3.3.7.2 Bilinear Luma and Chroma Sample Interpolation Process

Inputs to this process are:
a location in full-sample units (xInt, yInt),
a location offset in fractional-sample units (xFrac, yFrac),
a sample reference array refPicLX,
a flag chromaFlag.

Output of this process is a predicted sample value predPartLX[x][y].

[[In Figure I-1, the positions labelled with A, B, C, and D represent samples at full-sample locations inside the given two-dimensional array refPicLX of samples.

1. Figure I-1 Fractional Sample Position Dependent Variables in Bi-Linear Interpolation and Surrounding Integer Position Samples A, B, C, and D]]

The variable picWidthInSamples is set equal to pic_width_in_luma_samples and the variable picHeightInSamples is set equal to pic_height_in_luma_samples.

If chromaFlag is equal 0, xFrac is set equal to (xFrac<<1) and yFrac is set equal to (yFrac<<1).

Otherwise (chromaFlag is equal to 1), picWidthInSamples is set equal to (picWidthInSamples/SubWidthC) and picHeightInSamples is set equal to (picHeightInSamples/SubHeightC).

[[The coordinates of positions A, B, C and D are derived as follows:

$$xA = \text{Clip3}(0, \text{picWidthInSamples}-1, xInt) \quad (I-230)$$

$$xB = \text{Clip3}(0, \text{picWidthInSamples}-1, xInt+1) \quad (I-231)$$

$$xC = \text{Clip3}(0, \text{picWidthInSamples}-1, xInt) \quad (I-232)$$

$$xD = \text{Clip3}(0, \text{picWidthInSamples}-1, xInt+1) \quad (I-233)$$

$$yA = \text{Clip3}(0, \text{picHeightInSamples}-1, yInt) \quad (I-234)$$

$$yB = \text{Clip3}(0, \text{picHeightInSamples}-1, yInt) \quad (I-235)$$

$$yC=\text{Clip3}(0,\text{picHeightInSamples}-1,yInt+1) \quad (\text{I-236})$$

$$yD=\text{Clip3}(0,\text{picHeightInSamples}-1,yInt+1) \quad (\text{I-237})]]$$

In Figure 8-5 of HEVC specification, the positions labelled with upper-case letters $B_{i,j}$ within shaded blocks represent luma/chroma samples at full-sample locations inside the given two-dimensional array refPicLX of luma/chroma samples depending on chromaFlag. These samples may be used for generating the predicted luma/chroma sample value predSampleLX[x,y]. The location offset in fractional-sample units (xFrac$_C$, yFrac$_C$) specifies which of the generated samples at full-sample and fractional-sample locations is assigned to the predicted sample value predSampleLX[x,y]. This assignment is as specified in Table 8-8 with xFracC replaced by xFrac, yFracC replaced by yFrac, and predSampleLXC[x$_C$,y$_C$] by predSampleLX[x,y]. The output is the value of predSampleLX[x,y].

The locations (xB$_{i,j}$, yB$_{i,j}$) for each of the corresponding samples B$_{i,j}$ inside the given array refPicLX are derived as follows:

$$xB_{i,j}=\text{Clip3}(0,\text{picWidthInSamples}-1,xInt_C+i) \quad (\text{x-xxx})$$

$$yB_{i,j}=\text{Clip3}(0,\text{picHeightInSamples}-1,yInt_C+j) \quad (\text{x-xxx})$$

Set variable BitDepth equal to chromaFlag ? BitDepth$_C$: BitDepth$_Y$.

The variables shift1, shift2, and shift3 are derived as follows:

The variable shift1 is set equal to BitDepth−8, the variable shift2 is set equal to 6, and the variable shift3 is set equal to 14−BitDepth.

Given the chroma samples B$_{i,j}$ at full-sample locations (xB$_{i,j}$, yB$_{i,j}$), the chroma samples ab$_{0,0}$ to hh$_{0,0}$ at fractional sample positions are derived as follows:

The samples labelled ab$_{0,0}$, ac$_{0,0}$, ad$_{0,0}$, ae$_{0,0}$, af$_{0,0}$, ag$_{0,0}$, and ah$_{0,0}$ are derived by applying a 2-tap filter to the nearest integer position samples as follows:

[Ed. (CY): the equation numbers below need to be adjusted.]

$$ab_{0,0}=(56*B_{0,0}+8*B_{1,0})\text{>>shift1} \quad (8\text{-}216)$$

$$ac_{0,0}=(48*B_{0,0}+16*B_{1,0})\text{>>shift1} \quad (8\text{-}217)$$

$$ad_{0,0}=(40*B_{0,0}+24*B_{1,0})\text{>>shift1} \quad (8\text{-}218)$$

$$ae_{0,0}=(32*B_{0,0}+32*B_{1,0})\text{>>shift1} \quad (8\text{-}219)$$

$$af_{0,0}=(24*B_{0,0}+40*B_{1,0})\text{>>shift1} \quad (8\text{-}220)$$

$$ag_{0,0}=(16*B_{0,0}+48*B_{1,0})\text{>>shift1} \quad (8\text{-}221)$$

$$ah_{0,0}=(8*B_{0,0}+56*B_{1,0})\text{>>shift1} \quad (8\text{-}222)$$

The samples labelled ba$_{0,0}$, ca$_{0,0}$, da$_{0,0}$, ea$_{0,0}$, fa$_{0,0}$, ga$_{0,0}$, and ha$_{0,0}$ are derived by applying a 2-tap filter to the nearest integer position samples as follows:

$$ba_{0,0}=(56*B_{0,0}+8*B_{0,1})\text{>>shift1} \quad (8\text{-}223)$$

$$ca_{0,0}=(48*B_{0,0}+16*B_{0,1})\text{>>shift1} \quad (8\text{-}224)$$

$$da_{0,0}=(40*B_{0,0}+24*B_{0,1})\text{>>shift1} \quad (8\text{-}225)$$

$$ea_{0,0}=(32*B_{0,0}+32*B_{0,1})\text{>>shift1} \quad (8\text{-}226)$$

$$fa_{0,0}=(24*B_{0,0}+40*B_{0,1})\text{>>shift1} \quad (8\text{-}227)$$

$$ga_{0,0}=(16*B_{0,0}+48*B_{0,1})\text{>>shift1} \quad (8\text{-}228)$$

The samples labelled bX$_{0,0}$, cX$_{0,0}$, dX$_{0,0}$, eX$_{0,0}$, fX$_{0,0}$, gX$_{0,0}$, and hX$_{0,0}$ for X being replaced by b, c, d, e, f, g, and h, respectively, are derived by applying an 2-tap filter to the intermediate values aX$_{0,i}$ with i=−1 . . . 2 in the vertical direction as follows:

$$bX_{0,0}=(56*aX_{0,0}+8*aX_{0,1})\text{>>shift2} \quad (8\text{-}230)$$

$$cX_{0,0}=(48*aX_{0,0}+16*aX_{0,1})\text{>>shift2} \quad (8\text{-}231)$$

$$dX_{0,0}=(40*aX_{0,0}+24*aX_{0,1})\text{>>shift2} \quad (8\text{-}232)$$

$$eX_{0,0}=(32*aX_{0,0}+32*aX_{0,1})\text{>>shift2} \quad (8\text{-}233)$$

$$fX_{0,0}=(24*aX_{0,0}+40*aX_{0,1})\text{>>shift2} \quad (8\text{-}234)$$

$$gX_{0,0}=(16*aX_{0,0}+48*aX_{0,1})\text{>>shift2} \quad (8\text{-}235)$$

$$hX_{0,0}=(8*aX_{0,0}+56*aX_{0,1})\text{>>shift2} \quad (8\text{-}236)$$

Figure x-x—Integer samples (shaded blocks with upper-case letters) and fractional sample positions (un-shaded blocks with lower-case letters) for eighth sample interpolation [Ed. (CY): the figure can be removed in the current 3D-HEVC WD text since the text refers to the HEVC version 1 specification. Here it is kept for clarification purposes.]

[[The value of predPartLX[x][y] is derived as specified in the following:

$$\text{predPart}LX[x][y]=(\text{refPic}LX[xA][yA]*(8-x\text{Frac})*(8-y\text{Frac})+\text{refPic}LX[xB][yB]*(8-y\text{Frac})*x\text{Frac}+\text{refPic}LX[xC][yC]*(8-x\text{Frac})*y\text{Frac}+\text{refPic}LX[xD][yD]*x\text{Frac}*y\text{Frac})\text{>>}6 \quad (\text{I-238})]]$$

NOTE—: when chromaFlag is equal to 0, the two variables (i.e., xFrac and yFrac) are the modified inputs wherein both xFrac %2 and yFrac %2 shall be equal to 0.

FIG. 11 is a conceptual diagram illustrating example integer samples and fractional sample positions for eighth sample interpolation. In the example of FIG. 11, shaded squares with capital letter names correspond to full-integer pixel locations. As shown in the text above, a video coder uses different filter equations (i.e., filter equations 8-216 through 8-236) to determine filtered values for samples at different sub-integer pixel locations. The filter equations represent a separable bi-linear interpolation filter.

This bilinear interpolation filter is "separable" in that a first filter is applied to determine values of samples at primary sub-integer locations. The primary sub-integer locations are strictly vertical or horizontal from integer pixel locations. In FIG. 11, the primary sub-integer locations are locations ab$_{0,0}$, ac$_{0,0}$, ad$_{0,0}$, ae$_{0,0}$, af$_{0,0}$, ag$_{0,0}$, ah$_{0,0}$, ba$_{0,0}$, ca$_{0,0}$, da$_{0,0}$, ea$_{0,0}$, fa$_{0,0}$, ga$_{0,0}$, ha$_{0,0}$, ab$_{0,1}$, ac$_{0,1}$, ad$_{0,1}$, ae$_{0,1}$, af$_{0,1}$, ag$_{0,1}$, ah$_{0,1}$, ba$_{1,0}$, ca$_{1,0}$, da$_{1,0}$, ea$_{1,0}$, fa$_{1,0}$, and ga$_{1,0}$. A second filter is applied to samples at primary sub-integer locations to determine values of samples at secondary sub-integer locations. The secondary sub-integer locations are not strictly vertical or horizontal from integer pixel locations. In FIG. 11, the secondary sub-integer locations are the sub-integer locations within the box defined by the integer pixel locations (i.e., B$_{0,0}$, B$_{1,0}$, B$_{0,1}$, and B$_{1,1}$) and the primary sub-integer locations.

In this context, the term "phase" refers to a sub-integer location. Thus, each respective primary sub-integer location and secondary sub-integer is a respective "phase." As indicated above, the sum of coefficients of the filter of each phase adds up to 64. Each of filter equations 8-216 through 8-236 involves two coefficients, which may be defined a and b. In each of filter equations 8-216 through 8-236, the sum of coefficients a and b is equal to 64. For instance, the filter equation for sub-integer location ab$_{0,0}$ (i.e., equation 8-216) includes two coefficients 56 and 8, which sum to 64.

As shown in the text above, the bilinear interpolation process previously involved a series of clipping operations (i.e., equations 1-230 through 1-237) that the video coder used to derive coordinates of positions A, B, C, and D, as shown in FIG. 10. Furthermore, as discussed elsewhere in this disclosure, the clipping operations add complexity to the coding process. The modified text of this example implementation reduces the number of clipping operations by using a separable bilinear interpolation filter, as shown in equations (8-216 through 8-236) instead of the non-separable interpolation filter previously used.

In accordance with another example technique of this disclosure, the above text can be further simplified by utilizing smaller coefficients for the bilinear filter. This example does not necessarily provide bit-exact results compared to the example implementation above. Changes implementing this simplified example relative to the example implementation described above are shown below in underlined text.

. . .

The variable shift1 is set equal to BitDepth−8, the variable shift2 is set equal to [[6]] 0, and the variable shift3 is set equal to 14−BitDepth.

Given the chroma samples $B_{i,j}$ at full-sample locations $(xB_{i,j}, yB_{i,j})$, the chroma samples $ab_{0,0}$ to $hh_{0,0}$ at fractional sample positions are derived as follows:

The samples labelled $ab_{0,0}$, $ac_{0,0}$, $ad_{0,0}$, $ae_{0,0}$, $af_{0,0}$, $ag_{0,0}$, and $ah_{0,0}$ are derived by applying a 2-tap filter to the nearest integer position samples as follows:

$$ab_{0,0}=(7*B_{0,0}+1*B_{1,0})>>\text{shift1} \quad (8\text{-}216)$$

$$ac_{0,0}=(6*B_{0,0}+2*B_{1,0})>>\text{shift1} \quad (8\text{-}217)$$

$$ad_{0,0}=(5*B_{0,0}+3*B_{1,0})>>\text{shift1} \quad (8\text{-}218)$$

$$ae_{0,0}=(4*B_{0,0}+4*B_{1,0})>>\text{shift1} \quad (8\text{-}219)$$

$$af_{0,0}=(3*B_{0,0}+5*B_{1,0})>>\text{shift1} \quad (8\text{-}220)$$

$$ag_{0,0}=(2*B_{0,0}+6*B_{1,0})>>\text{shift1} \quad (8\text{-}221)$$

$$ah_{0,0}=(1*B_{0,0}+7*B_{1,0})>>\text{shift1} \quad (8\text{-}222)$$

The samples labelled $ba_{0,0}$, $ca_{0,0}$, $da_{0,0}$, $ea_{0,0}$, $fa_{0,0}$, $ga_{0,0}$, and $ha_{0,0}$ are derived by applying a 2-tap filter to the nearest integer position samples as follows:

$$ba_{0,0}=(7*B_{0,0}+1*B_{0,1})>>\text{shift1} \quad (8\text{-}223)$$

$$ca_{0,0}=(6*B_{0,0}+2*B_{0,1})>>\text{shift1} \quad (8\text{-}224)$$

$$da_{0,0}=(5*B_{0,0}+3*B_{0,1})>>\text{shift1} \quad (8\text{-}225)$$

$$ea_{0,0}=(4*B_{0,0}+4*B_{0,1})>>\text{shift1} \quad (8\text{-}226)$$

$$fa_{0,0}=(3*B_{0,0}+5*B_{0,1})>>\text{shift1} \quad (8\text{-}227)$$

$$ga_{0,0}=(2*B_{0,0}+6*B_{0,1})>>\text{shift1} \quad (8\text{-}228)$$

$$ha_{0,0}=(1*B_{0,0}+7*B_{0,1})>>\text{shift1} \quad (8\text{-}229)$$

The samples labelled $bX_{0,0}$, $cX_{0,0}$, $dX_{0,0}$, $eX_{0,0}$, $fX_{0,0}$, $gX_{0,0}$, and $hX_{0,0}$ for X being replaced by b, c, d, e, f, g, and h, respectively, are derived by applying an 2-tap filter to the intermediate values $aX_{0,i}$ with i=−1..2 in the vertical direction as follows:

$$bX_{0,0}=(7*aX_{0,0}+1*aX_{0,1})>>\text{shift2} \quad (8\text{-}230)$$

$$cX_{0,0}=(6*aX_{0,0}+2*aX_{0,1})>>\text{shift2} \quad (8\text{-}231)$$

$$dX_{0,0}=(5*aX_{0,0}+3*aX_{0,1})>>\text{shift2} \quad (8\text{-}232)$$

$$eX_{0,0}=(4*aX_{0,0}+4*aX_{0,1})>>\text{shift2} \quad (8\text{-}233)$$

$$fX_{0,0}=(3*aX_{0,0}+5*aX_{0,1})>>\text{shift2} \quad (8\text{-}234)$$

$$gX_{0,0}=(2*aX_{0,0}+6*aX_{0,1})>>\text{shift2} \quad (8\text{-}235)$$

$$hX_{0,0}=(1*aX_{0,0}+7*aX_{0,1})>>\text{shift2} \quad (8\text{-}236)$$

. . .

In other example techniques of this disclosure, a non-separable implementation of a bi-linear filter is used. In examples where a non-separable implementation of bi-linear filter is used, only the following modification of equation 1-238 as in I.8.5.3.3.7.1 of 3D-HEVC Draft Text 4 is needed. This example implementation does not necessarily provide bit-exact results compared to the two example implementations described above.

$$\text{pred}LX[x][y]=(\text{refPic}LX[xA][yA]*(8-x\text{Frac})*(8-y\text{Frac})+\text{refPic}LX[xB][yB]*(8-y\text{Frac})*x\text{Frac}+\text{refPic}LX[xC][yC]*(8-x\text{Frac})*y\text{Frac}+\text{refPic}LX[xD][yD]*x\text{Frac}*y\text{Frac})>>[[6]]\text{shift0}$$

In the equation above, shift0 is equal to bitDepth−8.

As indicated above, the illumination compensation process may involve unneeded clipping operations. In one example addressing the problem of redundant clipping operations in IC, all redundant clippings in IC are removed. This example removes clippings for both motion compensated samples and illumination compensated samples, i.e., by skipping the calculations in equation (1) and (3) (i.e., PredMcLX[x]=clip3(0,(1<<BitDepth)−1, (PredMcLX[x]+offset1)>>shift1) and IcPredLX[x]=clip3(0,(1<<BitDepth)−1, kPredMcLX[x]), respectively). In this example, in the same manner as HEVC version 1, only one clipping is performed for both bi-directional prediction and uni-directional prediction when IC is enabled.

In another example addressing the redundant clipping operations in IC, the illumination compensated sample is clipped to [0, 32767] to explicitly guarantee that IC can be performed by a 16-bit storage element. This example removes clipping of motion compensated samples, i.e., by skipping calculations in equation (1). Additionally, this example changes clipping of illumination compensated samples (i.e., equation (3)) as follows:

$$\text{IcPred}LX[x]=\text{clip3}(0,32767,\text{IcPred}LX[x]) \quad (8)$$

In such examples, three clippings and two clippings are performed for bi-directional prediction and uni-directional prediction respectively when IC is enabled. Both of these examples support conversion from bi-prediction to uni-prediction in IC in a non-normative manner (bi-prediction can be performed as uni-prediction if two motion vectors and their associated reference pictures are the same).

The following text shows changes to 3D-HEVC Draft Text 4 to reduce or eliminate redundant clipping operations in IC. In the text below, underlining indicates added text and italicized text in double square brackets is text deleted from 3D-HEVC Draft Text 4.

I.8.5.3.3.6 Illumination Compensated Sample Prediction Process

Inputs to this process are:
  a location (xCb, yCb) specifying the top-left sample of the current luma coding block relative to the top left sample of the current picture,
  the size of current luma coding block nCbS, a location (xB1, yB1) specifying the top-left sample of the current prediction block relative to the top left sample of the current coding block, the width and height of this prediction block, nPbW and nPbH, two (nPbW)×(nPbH) arrays predSamplesL0 and pred-SamplesL1, two prediction list utilization flags, predFlagL0 and pred-FlagL1, two reference indices, refIdxL0 and refIdxL1, two motion vector mvL0 and mvL1, a colour component index, cIdx.

Outputs of this process are:
the (nPbW)×(nPbH) array predSamples of prediction sample values.

[[Variables shift1, shift2, offset1 and offset2 are derived as follows:

The variable shift1 is set equal to 14−bitDepth and the variable shift2 is set equal to 15−bitDepth, The variable offset1 is derived as follows:
If shift1 is greater than 0, offset1 set equal to 1<<(shift1−1).
Otherwise (shift1 is equal to 0), offset1 is set equal to 0.

The variable offset2 is set equal to 1<<(shift2−1).]]

The variable bitDepth is derived as follows:
If cIdx is equal to 0, bitDepth is set equal to BitDepth$_Y$.
Otherwise (cIdx is equal to 1 or 2), bitDepth is set equal to BitDepth$_C$.

The derivation process for illumination compensation mode availability and parameters as specified in subclause I.8.5.3.3.6.1 is invoked with the luma location (xCb, yCb), the size of the current luma coding block nCbS, prediction list utilization flags, predFlagL0 and predFlagL1, reference indices refIdxL0 and refIdxL1, motion vectors mvL0 and mvL1, the bit depth of samples, bitDepth, a variable cIdx specifying colour component index as inputs, and the outputs are the flags puIcFlagL0 and puIcFlagL1 and the variables icWeightL0 and icWeightL1 specifying weights for illumination compensation, the variables icOffsetL0 and icOffsetL1 specifying offsets for illumination compensation.

Depending on the value of predFlagL0 and predFlagL1, the illumination compensated prediction samples predSamplesIcLX[x][y] with x=0 . . . (nPbW)−1 and y=0 . . . (nPbH)−1 are derived as follows:

For X in the range of 0 to 1, inclusive, the following applies:
When predFlagLX is equal to 1 the following applies:

[[clipPredVal=Clip3(0,(1<<bitDepth)−1,(predSamples
LX[x][y]+offset1)>>shift1)        (I-192)]]

predSamples*IcLX*[x][y][[predVal*X*]]=*!puIc*Flag
LX?predSamples*LX*[x][y][[clipPredVal]]:
([[Clip3(0,(1<<bitDepth)−1,]]([[clipPredVal]]
predSamples*LX*[x][y]**ic*Weight*LX*)>>5)+(*ic*Off-
set*LX*<<(14−bitDepth)) [[)]]        (I-193)

[[If predFlagL0 is equal to 1 and predFlagL1 is equal to 1, the following applies:

predSamples[x][y]=clip3(0,(1<<bitDepth)−1,(pred-
Val0+predVal1+offset2)>>shift2)        (I-194)

Otherwise (predFlagL0 is equal to 0 or predFlagL1 is equal to 0), the following applies:

predSamples[x][y]=predFlag*L*0?predVal0:predVal1        (I-195)]]

The array predSamples is derived by invoking the weighted sample prediction process specified in subclause 8.5.3.3.4 with the prediction block width nPbW, the prediction block height nPbH, and the sample arrays predSamplesIcL0 and predSamplesIcL1, and the variables predFlagL0, predFlagL1, refIdxL0, refIdxL1, and cIdx as inputs.

Weighted Sample Prediction Process

General

Inputs to this process are:
two variables nPbW and nPbH specifying the width and the height of the luma prediction block, two (nPbW)×(nPbH) arrays predSamplesL0 and predSamplesL1, the prediction list utilization flags, predFlagL0, and predFlagL1, the reference indices refIdxL0 and refIdxL1, a variable cIdx specifying colour component index.

Output of this process is the (nPbW)×(nPbH) array predSamples of prediction sample values.

The variable bitDepth is derived as follows:
If cIdx is equal to 0, bitDepth is set equal to BitDepth$_Y$.
Otherwise, bitDepth is set equal to BitDepth$_C$.

The variable weightedPredFlag is derived as follows:
If slice_type is equal to P, weightedPredFlag is set equal to weighted_pred_flag.
Otherwise (slice_type is equal to B), weightedPredFlag is set equal to weighted_bipred_flag.

The following applies:
If weightedPredFlag is equal to 0 or is flag is equal to 1, the array predSample of the prediction samples is derived by invoking the default weighted sample prediction process as specified in subclause 8.5.3.3.4.2 with the luma prediction block width nPbW, the luma prediction block height nPbH, two (nPbW)×(nPbH) arrays predSamplesL0 and predSamplesL1, the prediction list utilization flags predFlagL0 and predFlagL1, and the bit depth bitDepth as inputs.

Otherwise (weightedPredFlag is equal to 1), the array predSample of the prediction samples is derived by invoking the weighted sample prediction process as specified in subclause 8.5.3.3.4.3 with the luma prediction block width nPbW, the luma prediction block height nPbH, two (nPbW)×(nPbH) arrays predSamplesL0 and predSamplesL1, the prediction list utilization flags predFlagL0 and predFlagL1, the reference indices refIdxL0 and refIdxL1, the colour component index cIdx, and the bit depth bitDepth as inputs.

. . .

Figure 12:
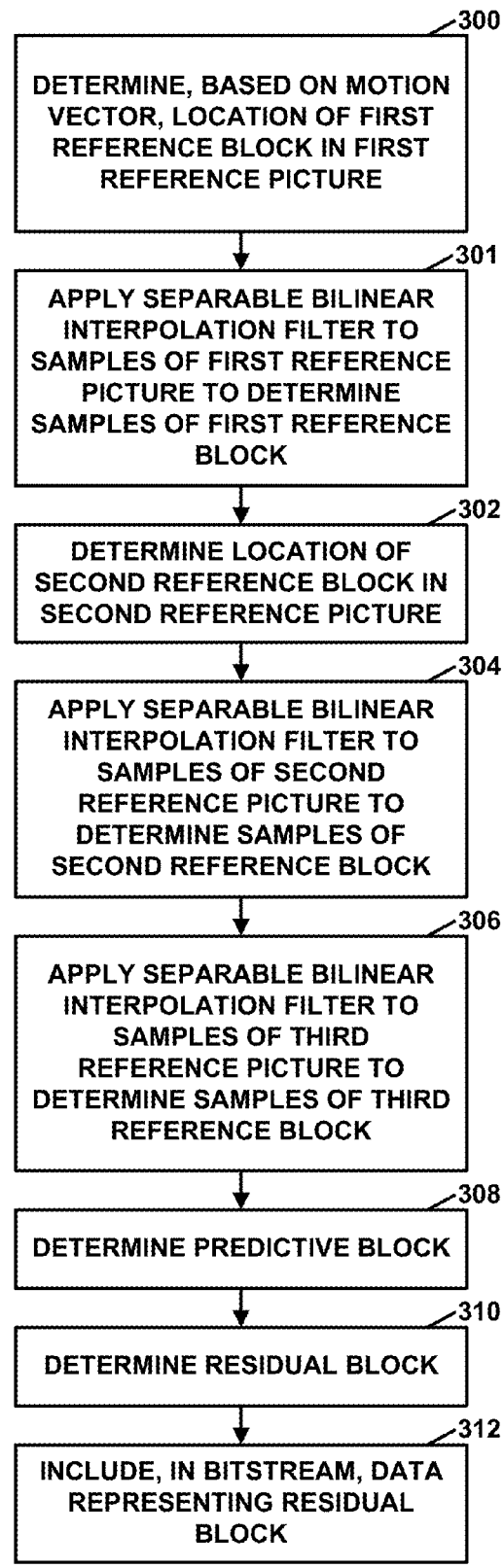
FIG. 12 is a flowchart illustrating an example operation of a video encoder, in accordance with a technique of this disclosure.

FIG. 12 is a flowchart illustrating an example operation of video encoder 20, in accordance with a technique of this disclosure. The flowcharts of this disclosure are provided as examples. Other examples may include more, fewer, or different actions, or may include the actions in different orders or in parallel. In the example of FIG. 12, video encoder 20 determines, based on a motion vector of a current block in a current picture of the video data, a location of a first reference block in a first reference picture (300). Video encoder 20 may apply a separable bilinear interpolation filter to samples of the first reference picture to determine samples of the first reference block (301).

Additionally, video encoder 20 determines a location of a second reference block in a second reference picture (302). Furthermore, video encoder 20 applies the separable bilinear interpolation filter to samples of the second reference picture to determine samples of the second reference block (304). Video encoder 20 applies the separable bilinear interpolation filter to samples of a third reference picture to determine samples of a third reference block (306). Each of the first, second, and third reference pictures is a different picture.

In some examples, a sum of coefficients of the separable bilinear interpolation filter of each phase is equal to 64. For instance, a sum of coefficients (a, b) of the separable bilinear interpolation filter is equal to (x*8, (8−x)*8), with x being equal to a value in a range of 0 through 8. Thus, in some examples, for each respective sample of the first reference block, second reference block, or the third reference block, video decoder 30 may apply, based on a position of the respective sample, one or more of the following formulas to determine the respective sample:

$$ab_{0,0}=(56*B_{0,0}+8*B_{1,0})>>shift1,$$

$$ac_{0,0}=(48*B_{0,0}+16*B_{1,0})>>shift1,$$

$$ad_{0,0}=(40*B_{0,0}+24*B_{1,0})>>shift1,$$

$$ae_{0,0}=(32*B_{0,0}+32*B_{1,0})>>shift1,$$

$$af_{0,0}=(24*B_{0,0}+40*B_{1,0})>>shift1,$$

$$ag_{0,0}=(16*B_{0,0}+48*B_{1,0})>>shift1,$$

$$ah_{0,0}=(8*B_{0,0}+56*B_{1,0})>>shift1,$$

$$ba_{0,0}=(56*B_{0,0}+8*B_{0,1})>>shift1,$$

$$ca_{0,0}=(48*B_{0,0}+16*B_{0,1})>>shift1,$$

$$da_{0,0}=(40*B_{0,0}+24*B_{0,1})>>shift1,$$

$$ea_{0,0}=(32*B_{0,0}+32*B_{0,1})>>shift1,$$

$$fa_{0,0}=(24*B_{0,0}+40*B_{0,1})>>shift1,$$

$$ga_{0,0}=(16*B_{0,0}+48*B_{0,1})>>shift1,$$

$$ha_{0,0}=(8*B_{0,0}+56*B_{0,1})>>shift1,$$

$$bX_{0,0}=(56*aX_{0,0}+8*aX_{0,1})>>shift2,$$

$$cX_{0,0}=(48*aX_{0,0}+16*aX_{0,1})>>shift2,$$

$$dX_{0,0}=(40*aX_{0,0}+24*aX_{0,1})>>shift2,$$

$$eX_{0,0}=(32*aX_{0,0}+32*aX_{0,1})>>shift2,$$

$$fX_{0,0}=(24*aX_{0,0}+40*aX_{0,1})>>shift2,$$

$$gX_{0,0}=(16*aX_{0,0}+48*aX_{0,1})>>shift2,$$

$$hX_{0,0}=(8*aX_{0,0}+56*aX_{0,1})>>shift2,$$

In the equations above, for samples labelled $bX_{0,0}$, $cX_{0,0}$, $dX_{0,0}$, $eX_{0,0}$, $fX_{0,0}$, $gX_{0,0}$, and $hX_{0,0}$, X is replaced by b, c, d, e, f, g, and h, respectively. Shift1 is equal to a bit depth of the respective sample minus 8 and shift2 is equal to 6. FIG. 11 shows the positions indicated above.

Video encoder 20 determines a predictive block (308). Each respective sample of the predictive block is equal to a respective sample of the first reference block minus a respective residual predictor sample. The respective residual predictor sample is equal to a weighting factor multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block. For example, the respective sample of the predictive block may be at coordinates (4,5), where the coordinates are relative to a top left sample of the predictive block. In this example, the respective samples of the first, second, and third reference blocks may be at coordinates (4,5), where the coordinates are relative to top left samples of the first, second, and third reference blocks, respectively. In some examples, the weighting factor is equal to 0, 0.5, or 1. Because the weighting factor may be equal to 1, in examples not applying weighting factors at all, respective residual predictor samples are still equal to a weighting factor (i.e., 1) multiplied by a difference between respective samples of the second reference block and respective samples of the third reference block.

Video encoder 20 determines a residual block (310). In examples where the current block is uni-directional, each respective sample of the residual block is equal to a difference between a respective sample of the current block and a respective sample of the predictive block. The respective sample of the current block and the respective sample of the predictive block correspond to a location of the respective sample of the residual block. As described elsewhere in this disclosure, in examples where the current block is bi-directional, the predictive block is a first predictive block and video encoder 20 determines the residual block based on samples in the first predictive block, samples in a second predictive block, and samples in the current block.

Video encoder 20 includes, in a bitstream, data representing the residual block (312). For example, video encoder 20 may generate, based on the residual block, one or more transform coefficient blocks. Furthermore, in this example, video encoder 20 may quantize the transform coefficients block and may generate syntax elements representing the quantized transform coefficient blocks. Video encoder 20 may entropy encode the syntax elements and include the entropy encoded syntax elements in a bitstream. Thus, in this example, the entropy encoded syntax elements comprise data representing the residual block.

Figure 13:
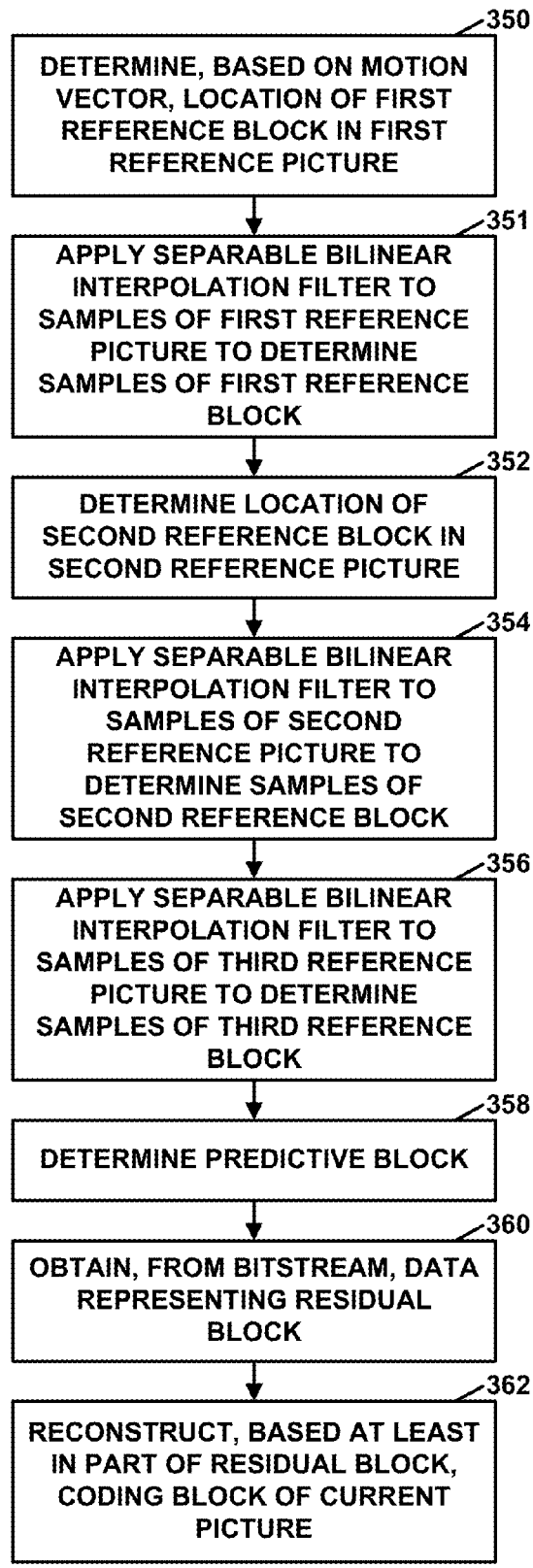
FIG. 13 is a flowchart illustrating an example operation of a video decoder, in accordance with a technique of this disclosure.

FIG. 13 is a flowchart illustrating an example operation of video decoder 30, in accordance with a technique of this disclosure. In the example of FIG. 13, video decoder 30 determines, based on a motion vector of a current block in a current picture of the video data, a location of a first reference block in a first reference picture (350). Video decoder 30 may apply a separable bilinear interpolation filter to samples of the first reference picture to determine samples of the first reference block (351).

Additionally, video decoder 30 determines a location of a second reference block in a second reference picture (352). Video decoder 30 applies the separable bilinear interpolation filter to samples of the second reference picture to determine samples of the second reference block (354). Furthermore, video decoder 30 applies the separable bilinear interpolation filter to samples of a third reference picture to determine samples of a third reference block (356). Each of the first, second, and third reference pictures is a different picture. In some examples, video decoder 30 applies the separable bilinear interpolation filter to determine samples of the first reference block.

In some example, a sum of coefficients of the separable bilinear interpolation filter of each phase is equal to 64. For instance, a sum of coefficients (a, b) of the separable bilinear interpolation filter are equal to (x*8, (8−x)*8), with x being equal to a value in a range of 0 through 8. Thus, in some examples, for each respective sample of the first reference block, second reference block, or the third reference block, video decoder 30 may apply, based on a position of the respective sample, one or more of the following formulas to determine the respective sample:

$$ab_{0,0}=(56*B_{0,0}+8*B_{1,0})\text{>>shift1},$$

$$ac_{0,0}=(48*B_{0,0}+16*B_{1,0})\text{>>shift1},$$

$$ad_{0,0}=(40*B_{0,0}+24*B_{1,0})\text{>>shift1},$$

$$ae_{0,0}=(32*B_{0,0}+32*B_{1,0})\text{>>shift1},$$

$$af_{0,0}=(24*B_{0,0}+40*B_{1,0})\text{>>shift1},$$

$$ag_{0,0}=(16*B_{0,0}+48*B_{1,0})\text{>>shift1},$$

$$ah_{0,0}=(8*B_{0,0}+56*B_{1,0})\text{>>shift1},$$

$$ba_{0,0}=(56*B_{0,0}+8*B_{0,1})\text{>>shift1},$$

$$ca_{0,0}=(48*B_{0,0}+16*B_{0,1})\text{>>shift1},$$

$$da_{0,0}=(40*B_{0,0}+24*B_{0,1})\text{>>shift1},$$

$$ea_{0,0}=(32*B_{0,0}+32*B_{0,1})\text{>>shift1},$$

$$fa_{0,0}=(24*B_{0,0}+40*B_{0,1})\text{>>shift1},$$

$$ga_{0,0}=(16*B_{0,0}+48*B_{0,1})\text{>>shift1},$$

$$ha_{0,0}=(8*B_{0,0}+56*B_{0,1})\text{>>shift1},$$

$$bX_{0,0}=(56*aX_{0,0}+8*aX_{0,1})\text{>>shift2},$$

$$cX_{0,0}=(48*aX_{0,0}+16*aX_{0,1})\text{>>shift2},$$

$$dX_{0,0}=(40*aX_{0,0}+24*aX_{0,1})\text{>>shift2},$$

$$eX_{0,0}=(32*aX_{0,0}+32*aX_{0,1})\text{>>shift2},$$

$$fX_{0,0}=(24*aX_{0,0}+40*aX_{0,1})\text{>>shift2},$$

$$gX_{0,0}=(16*aX_{0,0}+48*aX_{0,1})\text{>>shift2},$$

$$hX_{0,0}=(8*aX_{0,0}+56*aX_{0,1})\text{>>shift2},$$

In the equations above, for samples labelled $bX_{0,0}$, $cX_{0,0}$, $dX_{0,0}$, $eX_{0,0}$, $fX_{0,0}$, $gX_{0,0}$, and $hX_{0,0}$, X is replaced by b, c, d, e, f, g, and h, respectively. Shift1 is equal to a bit depth of the respective sample minus 8 and shift2 is equal to 6. FIG. 11 shows the positions indicated above.

Video decoder 30 determines a predictive block (358). In some examples, each respective sample of the predictive block is equal to a respective sample of the first reference block plus a respective residual predictor sample. In such examples, the respective residual predictor sample is equal to a weighting factor multiplied by a difference between a respective sample of the second reference block and a respective sample of the third reference block. The respective sample of the first reference block, the respective sample of the second reference block, and the respective sample of the third reference block are at locations within the first, second, and third reference blocks corresponding to a location of the respective sample of the predictive block. For example, the respective sample of the predictive block may be at coordinates (4,5), where the coordinates are relative to a top left sample of the predictive block. In this example, the respective samples of the first, second, and third reference blocks may be at coordinates (4,5), where the coordinates are relative to top left samples of the first, second, and third reference blocks, respectively.

Video decoder 30 obtains, from a bitstream, data representing a residual block (360). For example, video decoder 30 may entropy decode a bit sequence in the bitstream to recover syntax elements representing quantized transform coefficient values. In this example, video decoder 30 may inverse quantize the quantized transform coefficients and apply an inverse transform to recover the samples of the residual block.

Furthermore, video decoder 30 reconstructs, based at least in part on the residual block and the predictive block, a coding block of the current picture (362). For example, the current block may be a PU having a prediction block corresponding to some or all of a coding block of a CU. In this example, assuming the PU is uni-directional, video decoder 30 may reconstruct the prediction block of the PU (i.e., the portion of the coding block corresponding to the PU) such that each respective sample of the prediction block is equal to a respective sample of the residual block plus a respective sample of the predictive block. The respective sample of the residual block and the respective sample of the predictive block are at respective locations within the residual block and the predictive block corresponding to a location of the respective sample of the prediction block of the PU.

In the example operations of FIG. 12 and FIG. 13, a video coder (e.g., video encoder 20 or video decoder 30) may perform further perform similar operations for bi-directionally inter predicted blocks. Thus, the predictive block mentioned above may be considered a first predictive block. For example, the video coder may determine, based on a second motion vector of the current block, a location of a fourth reference block (e.g., CurrTRef) in a fourth reference picture. The video coder may apply the separable bilinear interpolation filter to samples of the fourth reference picture to determine samples of the fourth reference block. Additionally, the video coder may determine, based in part on the second motion vector, a location of a fifth reference block (e.g., BaseTRef) in a fifth reference picture. Furthermore, the video coder may apply the separable bilinear interpolation filter to samples of the fifth reference picture to determine samples of the fifth reference block. The video coder may apply the separable bilinear interpolation filter to samples of a sixth reference picture to determine samples of a sixth reference block (e.g., Base). Each of the fourth, fifth, and sixth reference pictures is a different picture. In some examples, the video coder may also apply the separable bilinear interpolation filter to determine samples of the fourth reference block (e.g., CurrTRef). Furthermore, video coder may determine a second predictive block. Each respective sample of the second predictive block is equal to a respective sample of the fourth reference block (e.g., CurrTRef) plus a respective residual predictor sample. In this example, the respective residual predictor sample is equal to the weighting factor multiplied by a difference between a respective sample of the fifth reference block (e.g., BaseTRef) and a respective sample of the sixth reference block (e.g., Base). The respective sample of the fourth reference block, the respective sample of the fifth reference block, and the respective sample of the sixth reference block are at locations within the fourth, fifth, and sixth reference blocks corresponding to a location of the respective sample of the second predictive block. In some examples, at least one of the fifth and sixth reference blocks are identical to the second or third reference blocks.

In this example, if the video coder is a video decoder, the video coder may reconstruct, based at least in part on the residual block, the first predictive block and also the second predictive block, a coding block of the current picture. For example, the video decoder may determine a final predictive block based on the first predictive block and the second predictive block. Each respective sample of the final predictive block may be a weighted average of corresponding samples of the first predictive block and the second predictive block. In this example, each respective sample of the reconstructed coding block may be equal to a sum of corresponding samples in the residual block and the final predictive block.

If the video coder is a video encoder, the video coder may determine, based at least in part on the first predictive block and the second predictive block, a residual block. For instance, in this example, the video coder may determine a final predictive block in the manner described above. In this example, each respective sample of the residual block is equal to a difference between a respective sample of the current block and a corresponding respective sample of the final predictive block. The respective sample of the second block and the respective sample of the second predictive block correspond to a location of the respective sample of the second residual block. The video encoder may include, in a bitstream, data representing the residual block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   determining a location of a first reference block in a first reference picture, wherein a motion vector of a current block in a current picture of the video data indicates the location of the first reference block in the first reference picture;
   applying a separable bilinear interpolation filter to samples of the first reference picture to determine samples of the first reference block;
   determining a location of a second reference block in a second reference picture;
   applying the separable bilinear interpolation filter to samples of the second reference picture to determine samples of the second reference block;
   applying the separable bilinear interpolation filter to samples of a third reference picture to determine samples of a third reference block, wherein each of the first, second, and third reference pictures is a different picture, wherein one of the following applies:
   the motion vector of the current block is a temporal motion vector of the current block, the current picture is in a first view, the second reference picture and the third reference picture are both in a second view different from the first view, a Picture Order Count (POC) value of the third reference picture is equal to a POC value of the current picture, and a POC value of the first reference picture is equal to a POC value of the second reference picture, the POC value of the first reference picture and the POC value of the second reference picture being different from the POC value of the current picture, or
   the motion vector of the current block is a disparity motion vector of the current block, the current picture and the second reference picture are both in the first view, the third reference picture is in the second view, the POC value of the second reference picture is different from the POC value of the current picture, the POC value of the third reference picture is different from the POC value of the current picture and equal to the POC value of the second reference picture, and the first reference picture has the same POC value as the current picture and is in the second view; and determining a predictive block, wherein each respective sample of the predictive block is equal to a respective sample of the first reference block plus a respective residual predictor sample, the respective residual predictor sample being equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block, wherein, for each respective phase of a plurality of phases, a sum of respective coefficients of the separable bilinear interpolation filter for the respective phase is equal to 64, each respective phase of the plurality of phases corresponding to a respective sub-integer location allowed by a video coding standard, and the respective coefficients of the separable bilinear interpolation filter for the respective phase being equal to (x*8, (8−x)*8), with x being equal to a value in a range of 0 through 8; and performing at least one of:
  determining, based at least in part on the predictive block, a residual block, and including, in a bitstream, data representing the residual block; or
  obtaining, from a bitstream, data representing a residual block and reconstructing, based at least in part on the residual block and the predictive block, a coding block of the current picture.

2. The method of claim 1, wherein applying the separable bilinear interpolation filter to the samples of the first reference picture, applying the separable bilinear interpolation filter to the samples of the second reference picture, and applying the separable bilinear interpolation filter to the sample of the third reference picture comprise:

for each respective sample of the first reference block, the second reference block, and the third reference block, applying, based on a position of the respective sample, one or more of the following formulas to determine the respective sample:

$ab_{0,0} = (56*B_{0,0} + 8*B_{1,0}) \gg shift1$, $ac_{0,0} = (48*B_{0,0} + 16*B_{1,0}) \gg shift1$, $ad_{0,0} = (40*B_{0,0} + 24*B_{1,0}) \gg shift1$, $ae_{0,0} = (32*B_{0,0} + 32*B_{1,0}) \gg shift1$, $af_{0,0} = (24*B_{0,0} + 40*B_{1,0}) \gg shift1$, $ag_{0,0} = (16*B_{0,0} + 48*B_{1,0}) \gg shift1$, $ah_{0,0} = (8*B_{0,0} + 56*B_{1,0}) \gg shift1$, $ba_{0,0} = (56*B_{0,0} + 8*B_{0,1}) \gg shift1$, $ca_{0,0} = (48*B_{0,0} + 16*B_{0,1}) \gg shift1$, $da_{0,0} = (40*B_{0,0} + 24*B_{0,1}) \gg shift1$, $ea_{0,0} = (32*B_{0,0} + 32*B_{0,1}) \gg shift1$, $fa_{0,0} = (24*B_{0,0} + 40*B_{0,1}) \gg shift1$, $ga_{0,0} = (16*B_{0,0} + 48*B_{0,1}) \gg shift1$, $ha_{0,0} = (8*B_{0,0} + 56*B_{0,1}) \gg shift1$, $bX_{0,0} = (56*aX_{0,0} + 8*aX_{0,1}) \gg shift2$, $cX_{0,0} = (48*aX_{0,0} + 16*aX_{0,1}) \gg shift2$, $dX_{0,0} = (40*aX_{0,0} + 24*aX_{0,1}) \gg shift2$, $eX_{0,0} = (32*aX_{0,0} + 32*aX_{0,1}) \gg shift2$, $fX_{0,0} = (24*aX_{0,0} + 40*aX_{0,1}) \gg shift2$, $gX_{0,0} = (16*aX_{0,0} + 48*aX_{0,1}) \gg shift2$, $hX_{0,0} = (8*aX_{0,0} + 56*aX_{0,1}) \gg shift2$, wherein for samples labelled $bX_{0,0}$, $cX_{0,0}$, $dX_{0,0}$, $eX_{0,0}$, $fX_{0,0}$, $gX_{0,0}$, and $hX_{0,0}$, X is replaced by b, c, d, e, f, g, and h, respectively, and wherein shift1 is equal to a bit depth of the respective sample minus 8 and shift2 is equal to 6.

3. The method of claim 1, wherein:
the current picture is in the first view,
the second reference picture and the third reference picture are both in the second view,
the motion vector of the current block is the temporal motion vector of the current block,
the POC value of the third reference picture is equal to the POC value of the current picture,
the method further comprises:
  determining the first reference picture, wherein the POC value of the first reference picture is equal to the POC value of the second reference picture, the POC value of the first reference picture and the POC value of the second reference picture being different from the POC value of the current picture; and
  determining, based on a disparity vector of the current block, a location of the third reference block in the third reference picture, and
determining the location of the second reference block comprises determining the location of the second reference block such that the location of the second reference block is indicated by a sum of the temporal motion vector of the current block and the disparity vector of the current block.

4. The method of claim 1, wherein:
the current picture and the second reference picture are both in the first view,
the third reference picture is in the second view,
the motion vector of the current block is the disparity motion vector of the current block,
the POC value of the second reference picture is different from the POC value of the current picture,
the POC value of the third reference picture is different from the POC value of the current picture and equal to the POC value of the second reference picture,
the method further comprises:
  determining, based on the disparity motion vector of the current block, the first reference block, wherein the first reference picture has the same POC value as the current picture and is in the second view; and
  determining a location of the third reference block such that the location of the third reference block in the third reference picture is indicated by a temporal motion vector of the first reference block, and determining the location of the second reference block comprises reusing the temporal motion vector of the first reference block to determine the location of the second reference block.

5. The method of claim 1, wherein the predictive block is a first predictive block, the method further comprising:
determining a location of a fourth reference block in a fourth reference picture, a second motion vector of the current block indicating the location of the fourth block of the fourth reference picture;
applying the separable bilinear interpolation filter to samples of the fourth reference picture to determine samples of the fourth reference block;
determining, based in part on the second motion vector of the current block, a location of a fifth reference block in a fifth reference picture;
applying the separable bilinear interpolation filter to samples of the fifth reference picture to determine samples of the fifth reference block;
applying the separable bilinear interpolation filter to samples of a sixth reference picture to determine samples of a sixth reference block, wherein each of the fourth, fifth, and sixth reference pictures is a different picture; and
determining a second predictive block, wherein each respective sample of the second predictive block is equal to a respective sample of the fourth reference block plus a respective residual predictor sample, the respective residual predictor sample being equal to the weighting factor multiplied by a difference between a respective sample of the fifth reference block and a respective sample of the sixth reference block, and wherein the respective sample of the fourth reference block, the respective sample of the fifth reference block, and the respective sample of the sixth reference block are at locations within the fourth, fifth, and sixth reference blocks corresponding to a location of the respective sample of the second predictive block, and
reconstructing, based at least in part on a residual block, the first predictive block, and the second predictive block, the coding block of the current picture.

6. A video coding device comprising:
a memory configured to store video data; and
one or more processors configured to:
determine a location of a first reference block in a first reference picture, wherein a motion vector of a current block in a current picture of the video data indicates the location of the first reference block in the first reference picture;
apply a separable bilinear interpolation filter to samples of the first reference picture to determine samples of the first reference block;
determine a location of a second reference block in a second reference picture;
apply the separable bilinear interpolation filter to samples of the second reference picture to determine samples of the second reference block;
apply the separable bilinear interpolation filter to samples of a third reference picture to determine samples of a third reference block, wherein each of the first, second, and third reference pictures is a different picture, wherein one of the following applies:
the motion vector of the current block is a temporal motion vector of the current block, the current picture is in a first view, the second reference picture and the third reference picture are both in a second view different from the first view, a Picture Order Count (POC) value of the third reference picture is equal to a POC value of the current picture, and a POC value of the first reference picture is equal to a POC value of the second reference picture, the POC value of the first reference picture and the POC value of the second reference picture being different from the POC value of the current picture, or
the motion vector of the current block is a disparity motion vector of the current block, the current picture and the second reference picture are both in the first view, the third reference picture is in the second view, the POC value of the second reference picture is different from the POC value of the current picture, the POC value of the third reference picture is different from the POC value of the current picture and equal to the POC value of the second reference picture, and the first reference picture has the same POC value as the current picture and is in the second view; and
determine a predictive block, wherein each respective sample of the predictive block is equal to a respective sample of the first reference block minus a respective residual predictor sample, the respective residual predictor sample is equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block,
wherein, for each respective phase of a plurality of phases, a sum of respective coefficients of the separable bilinear interpolation filter for the respective phase is equal to 64, each respective phase of the plurality of phases corresponding to a respective sub-integer location allowed by a video coding standard, and the respective coefficients of the separable bilinear interpolation filter for the respective phase being equal to (x*8, (8−x)*8), with x being equal to a value in a range of 0 through 8; and
perform at least one of:
determine a residual block, each respective sample of the residual block being equal to a difference between a respective sample of the current block and a respective sample of the predictive block, wherein the respective sample of the current block and the respective sample of the predictive block correspond to a location of the respective sample of the residual block, and include, in a bitstream, data representing the residual block; or
obtain, from a bitstream, data representing a residual block and reconstruct, based at least in part on the residual block and the predictive block, a coding block of the current picture.

7. The video coding device of claim 6, wherein the one or more processors are configured such that, as part of applying the separable bilinear interpolation filter to samples of the first reference picture, applying the separable bilinear interpolation filter to the samples of the second reference picture, and applying the separable bilinear interpolation filter to the sample of the third reference picture, the one or more processors:

for each respective sample of the first reference block, the second reference block, and the third reference block, apply, based on a position of the respective sample, one or more of the following formulas to determine the respective sample:

$ab_{0,0} = (56 * B_{0,0} + 8 * B_{1,0}) >> \text{shift1}$, $ac_{0,0} = (48 * B_{0,0} + 16 * B_{1,0}) >> \text{shift1}$, $ad_{0,0} = (40 * B_{0,0} + 24 * B_{1,0}) >> \text{shift1}$, $ae_{0,0} = (32 * B_{0,0} + 32 * B_{1,0}) >> \text{shift1}$, $af_{0,0} = (24 * B_{0,0} + 40 * B_{1,0}) >> \text{shift1}$, $ag_{0,0} = (16 * B_{0,0} + 48 * B_{1,0}) >> \text{shift1}$, $ah_{0,0} = (8 * B_{0,0} + 56 * B_{1,0}) >> \text{shift1}$, $ba_{0,0} = (56 * B_{0,0} + 8 * B_{0,1}) >> \text{shift1}$, $ca_{0,0} = (48 * B_{0,0} + 16 * B_{0,1}) >> \text{shift1}$, $da_{0,0} = (40 * B_{0,0} + 24 * B_{0,1}) >> \text{shift1}$, $ea_{0,0} = (32 * B_{0,0} + 32 * B_{0,1}) >> \text{shift1}$, $fa_{0,0} = (24 * B_{0,0} + 40 * B_{0,1}) >> \text{shift1}$, $ga_{0,0} = (16 * B_{0,0} + 48 * B_{0,1}) >> \text{shift1}$, $ha_{0,0} = (8 * B_{0,0} + 56 * B_{0,1}) >> \text{shift1}$, $bX_{0,0} = (56 * aX_{0,0} + 8 * aX_{0,1}) >> \text{shift2}$, $cX_{0,0} = (48 * aX_{0,0} + 16 * aX_{0,1}) >> \text{shift2}$, $dX_{0,0} = (40 * aX_{0,0} + 24 * aX_{0,1}) >> \text{shift2}$, $eX_{0,0} = (32 * aX_{0,0} + 32 * aX_{0,1}) >> \text{shift2}$, $fX_{0,0} = (24 * aX_{0,0} + 40 * aX_{0,1}) >> \text{shift2}$, $gX_{0,0} = (16 * aX_{0,0} + 48 * aX_{0,1}) >> \text{shift2}$, $hX_{0,0} = (8 * aX_{0,0} + 56 * aX_{0,1}) >> \text{shift2}$, wherein for samples labelled $bX_{0,0}$, $cX_{0,0}$, $dX_{0,0}$, $eX_{0,0}$, $fX_{0,0}$, $gX_{0,0}$, and $hX_{0,0}$, X is replaced by b, c, d, e, f, g, and h, respectively, and wherein shift1 is equal to a bit depth of the respective sample minus 8 and shift2 is equal to 6.

8. The video coding device of claim 6, wherein:
the current picture is in the first view,
the second reference picture and the third reference picture are both in the second view,
the motion vector of the current block is the temporal motion vector of the current block, the POC value of the third reference picture is equal to the POC value of the current picture,
the one or more processors are further configured to:
determine the first reference picture, wherein the POC value of the first reference picture is equal to the POC value of the second reference picture, the POC value of the first reference picture and the POC value of the second reference picture being different from the POC value of the current picture; and
determine, based on a disparity vector of the current block, a location of the third reference block in the third reference picture, and the one or more processors are configured such that as part of determining the location of the second reference block, the one or more processors determine the location of the second reference block such that the location of the second reference block is indicated by a sum of the temporal motion vector of the current block and the disparity vector of the current block.

9. The video coding device of claim 6, wherein:
the current picture and the second reference picture are both in the first view,
the third reference picture is in the second view,
the motion vector of the current block is the disparity motion vector of the current block,
the POC value of the second reference picture is different from the POC value of the current picture,
the POC value of the third reference picture is different from the POC value of the current picture and equal to the POC value of the second reference picture,
the one or more processors are further configured to:
determine, based on the disparity motion vector of the current block, the first reference block, wherein the first reference picture has the same POC value as the current picture and is in the second view; and
determine a location of the third reference block in the third reference picture such that the location of the third reference block is indicated by a temporal motion vector of the first reference block, and
the one or more processors are configured such that, as part of determining the location of the second reference block, the one or more processors reuse the temporal motion vector of the first reference block to determine the location of the second reference block.

10. The video coding device of claim 6, wherein the predictive block is a first predictive block, the one or more processors are configured to:
determine a location of a fourth reference block in a fourth reference picture, a second motion vector of the current block indicating the location of the fourth reference block in the fourth reference picture;
apply the separable bilinear interpolation filter to samples of the fourth reference picture to determine samples of the fourth reference block;
determine, based in part on the second motion vector of the current block, a location of a fifth reference block in a fifth reference picture;
apply the separable bilinear interpolation filter to samples of the fifth reference picture to determine samples of the fifth reference block;
apply the separable bilinear interpolation filter to samples of a sixth reference picture to determine samples of a sixth reference block, wherein each of the fourth, fifth, and sixth reference pictures is a different picture; and
determine a second predictive block, wherein each respective sample of the second predictive block is equal to a respective sample of the fourth reference block plus a respective residual predictor sample, the respective residual predictor sample being equal to the weighting factor multiplied by a difference between a respective sample of the fifth reference block and a respective sample of the sixth reference block, and wherein the respective sample of the fourth reference block, the respective sample of the fifth reference block, and the respective sample of the sixth reference block are at locations within the fourth, fifth, and sixth reference blocks corresponding to a location of the respective sample of the second predictive block.

11. The video coding device of claim 6, further comprising a display configured to display the reconstructed coding block of the current picture.

12. The video coding device of claim 6, further comprising a camera configured to capture the current picture.

13. The video coding device of claim 6, wherein the device comprises at least one of:
   an integrated circuit;
   a microprocessor; or
   a wireless communication device.

14. A non-transitory computer-readable storage medium having instructions stored thereon that, when executed, cause a device for coding video data to:
   determine a location of a first reference block in a first reference picture, wherein a motion vector of a current block in a current picture of the video data indicates the location of the first reference block in the first reference picture;
   apply a separable bilinear interpolation filter to samples of the first reference picture to determine samples of the first reference block;
   determine a location of a second reference block in a second reference picture;
   apply the separable bilinear interpolation filter to samples of the second reference picture to determine samples of the second reference block;
   apply the separable bilinear interpolation filter to samples of a third reference picture to determine samples of a third reference block, wherein each of the first, second, and third reference pictures is a different picture, wherein one of the following applies:
      the motion vector of the current block is a temporal motion vector of the current block, the current picture is in a first view, the second reference picture and the third reference picture are both in a second view different from the first view, a Picture Order Count (POC) value of the third reference picture is equal to a POC value of the current picture, and a POC value of the first reference picture is equal to a POC value of the second reference picture, the POC value of the first reference picture and the POC value of the second reference picture being different from the POC value of the current picture, or
      the motion vector of the current block is a disparity motion vector of the current block, the current picture and the second reference picture are both in the first view, the third reference picture is in the second view, the POC value of the second reference picture is different from the POC value of the current picture, the POC value of the third reference picture is different from the POC value of the current picture and equal to the POC value of the second reference picture, and the first reference picture has the same POC value as the current picture and is in the second view; and
   determine a predictive block, wherein each respective sample of the predictive block is equal to a respective sample of the first reference block plus a respective residual predictor sample, the respective residual predictor sample being equal to a weighting factor multiplied by a difference between a respective sample of the second reference block and a respective sample of the third reference block, wherein the respective sample of the first reference block, the respective sample of the second reference block, and the respective sample of the third reference block are at locations within the first, second, and third reference blocks corresponding to a location of the respective sample of the predictive block,
   wherein, for each respective phase of a plurality of phases, a sum of respective coefficients of the separable bilinear interpolation filter for the respective phase is equal to 64, each respective phase of the plurality of phases corresponding to a respective sub-integer location allowed by a video coding standard, and the respective coefficients of the separable bilinear interpolation filter for the respective phase being equal to (x*8, (8−x)*8), with x being equal to a value in a range of 0 through 8
   perform at least one of:
      determine, based at least in part on the predictive block, a residual block and include, in a bitstream, data representing the residual block; or
      obtain, from a bitstream, data representing a residual block and reconstruct, based at least in part on the residual block and the predictive block, a coding block of the current picture.

* * * * *